United States Patent
Hornberger et al.

(10) Patent No.: US 6,496,340 B1
(45) Date of Patent: Dec. 17, 2002

(54) ARRANGEMENT WITH AN ELECTRIC MOTOR

(75) Inventors: Jörg Hornberger, Dornstetten (DE); Frank Jeske, Georgen (DE); Hansjörg Kaltenbrunner, Pfaffenweiler (DE); Arno Karwath, Rottweil (DE); Hermann Rappenecker, Vöhrenbach (DE); Thomas Dufner, Schonach (DE)

(73) Assignee: Papst-Motoren GmbH & Co. KG, St. Georgen (DE)

( * ) Notice: Subject to any disclaimer, the term of this patent is extended or adjusted under 35 U.S.C. 154(b) by 0 days.

(21) Appl. No.: 09/720,221

(22) PCT Filed: Jul. 21, 1999

(86) PCT No.: PCT/EP99/05186

§ 371 (c)(1),
(2), (4) Date: Dec. 21, 2000

(87) PCT Pub. No.: WO00/10240

PCT Pub. Date: Feb. 24, 2000

(30) Foreign Application Priority Data

Aug. 14, 1998 (DE) .......................................... 198 36 882

(51) Int. Cl.[7] .................................................. H02H 3/00
(52) U.S. Cl. ............................. 361/51; 361/23; 361/103
(58) Field of Search ............................. 361/51, 115, 18, 361/23, 24, 25, 103, 106

(56) References Cited

U.S. PATENT DOCUMENTS

| | | | |
|---|---|---|---|
| 4,030,363 A | 6/1977 | Halleck | 73/362 AR |
| 4,286,199 A | 8/1981 | Nagakubo et al. | 318/327 |
| 4,375,667 A * | 3/1983 | Buchan | 702/45 |
| 4,506,312 A | 3/1985 | Chan et al. | 361/240 |
| 4,743,815 A | 5/1988 | Gee et al. | 318/254 |
| 4,831,380 A | 5/1989 | Gimblett | 341/166 |
| 4,949,624 A | 8/1990 | Hara et al. | 98/2.01 |
| 4,955,431 A | 9/1990 | Saur et al. | 165/1 |
| 5,206,572 A | 4/1993 | Farag et al. | 318/778 |

(List continued on next page.)

FOREIGN PATENT DOCUMENTS

| | | | | |
|---|---|---|---|---|
| DE | 37 02 947 A1 | 11/1988 | | 165/1 |
| DE | 30 03 102 C2 | 12/1989 | | 318/327 |
| DE | 40 25 263 A1 | 2/1992 | | |
| DE | 44 41 372 A1 | 6/1995 | | 388/804 |
| DE | 196 47 983 A1 | 6/1997 | | |
| DE | 196 00 243 A1 | 7/1997 | | 318/560 |
| EP | 0 088 626 | 9/1983 | | 361/240 |
| EP | 0 684 692 A2 | 11/1995 | | 417/20 |
| WO | WO97-15111 | 4/1997 | | |
| WO | WO97-21268 | 6/1997 | | |

OTHER PUBLICATIONS

U. Claussen & G. Fromme, "Motorregelung mit Mikrorechner" [Motor Control with a Microprocessor], 1978, pp. 355–359.

A. K. Kochaar et al, "Polling" in *Data Transfer Techniques* (1983) by E. Arnold, pp. 129–131.

Derwent WPI English abstract of DE 30 03 102 C2 Nagakubo –/Sony, publ. Dec. 28, 1989 corresponding to U.S. 4,286,199.

(List continued on next page.)

*Primary Examiner*—Stephen W. Jackson
(74) *Attorney, Agent, or Firm*—Milton Oliver; Ware, Fressola Van Der Sluys & Adolphson LLP

(57) ABSTRACT

The rotation speed of an electric motor (9) is controlled by a controller (6) which receives its setpoint from a characteristic function (23). The characteristic function (23) calculates a setpoint for the controller (6) on the basis of an originally analog variable A (2) that is converted to digital by an A/D converter AD (10), with the aid of support values of a "MEM+DATA" characteristic that are stored in a memory (4); those values not predefined by the support values are calculated by interpolation.

42 Claims, 29 Drawing Sheets

U.S. PATENT DOCUMENTS

| | | |
|---|---|---|
| 5,275,012 A | 1/1994 | Dage et al. .................... 62/208 |
| 5,386,183 A | 1/1995 | Cronvich et al. ........... 318/434 |
| 5,447,414 A | 9/1995 | Nordby et al. ................ 417/20 |
| 5,448,442 A | 9/1995 | Farag ........................... 361/24 |
| 5,483,137 A | 1/1996 | Fey et al. .................... 318/560 |
| 5,492,273 A | 2/1996 | Shah ........................ 236/44 A |
| 5,583,404 A | 12/1996 | Karwath et al. ............ 318/254 |
| 5,610,484 A | 3/1997 | Georgin ....................... 318/286 |
| 5,632,156 A | 5/1997 | Takeo ........................ 62/228.4 |
| 5,717,297 A | 2/1998 | Karwatch et al. ........... 318/254 |
| 5,736,823 A | 4/1998 | Nordby et al. .............. 318/432 |
| 5,825,642 A | 10/1998 | Ishii et al. ................... 363/141 |
| 5,845,045 A | 12/1998 | Jeske et al. ................. 388/804 |
| 6,037,732 A | 3/2000 | Alfano et al. ................ 318/471 |
| 6,188,602 B1 | 2/2001 | Alexander et al. ..... 365/185.04 |
| 6,249,885 B1 | 6/2001 | Johnson et al. ............... 714/47 |
| 6,318,965 B1 | 11/2001 | Nair .............................. 417/2 |

OTHER PUBLICATIONS

Derwent WPI English abstract of DE 37 02 947 A1 Schaper publ. Aug. 11, 1988, corresponding to U.S. 4,955,431.

Derwent WPI English abstract of DE 196 00 243 A1, Fey +/Fichtel + SACHS AG, publ. Jul. 10, 1997, corresponding to US 5,483,137.

Derwent WPI English abstract of EP 0 088 626 A3, Chan +/Ford, publ. Sep. 14, 1983, corresponding to U.S. 4,506,312.

Derwent WPI English abstract of EP 0 684 692 A2, Skinner, publ. Nov. 29, 1995, corresponding to U.S. 5,447,414 & U.S. 5,736,823.

\* cited by examiner

| P | T | | n | | S |
|---|---|---|---|---|---|
| | °C | hex | min⁻¹ | hex | hex |
| 1 | 0 | 0x39 | 2000 | 0x07D0 | 0x0000 |
| 2 | 30 | 0x8D | 2000 | 0x07D0 | 0x001E |
| 3 | 60 | 0xCF | 4000 | 0x0FA0 | 0x0000 |
| 4 | 100 | 0xF1 | 4000 | 0x0FA0 | 0x0000 |

Fig. 12

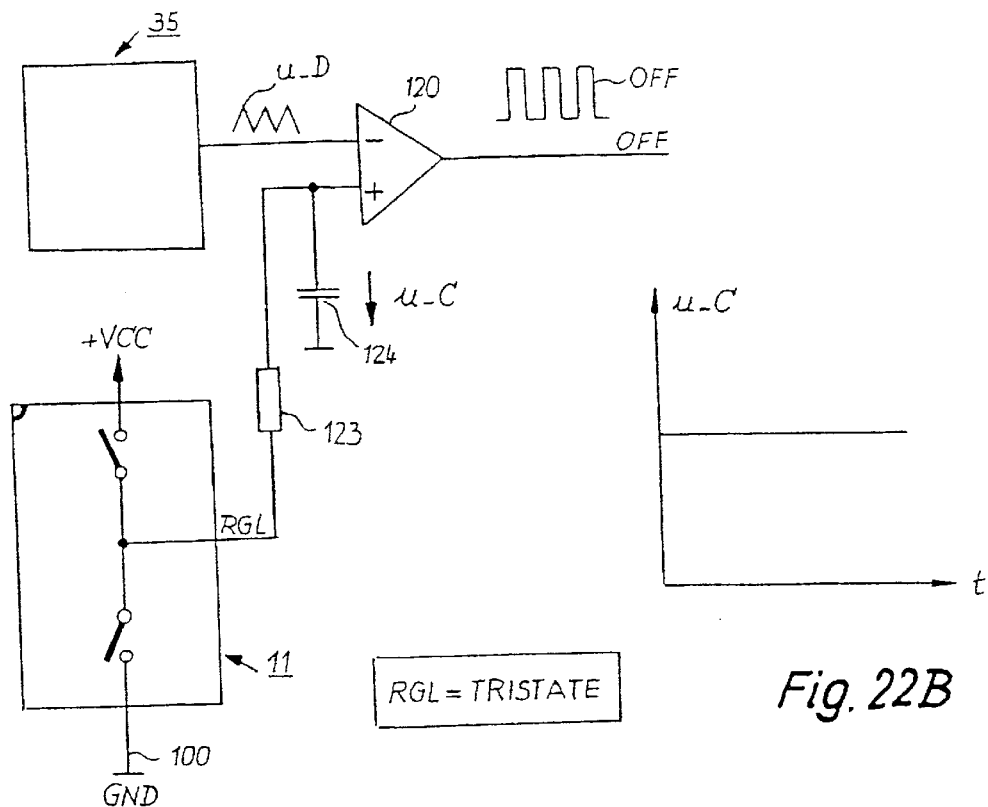
Fig. 22A
Fig. 22B
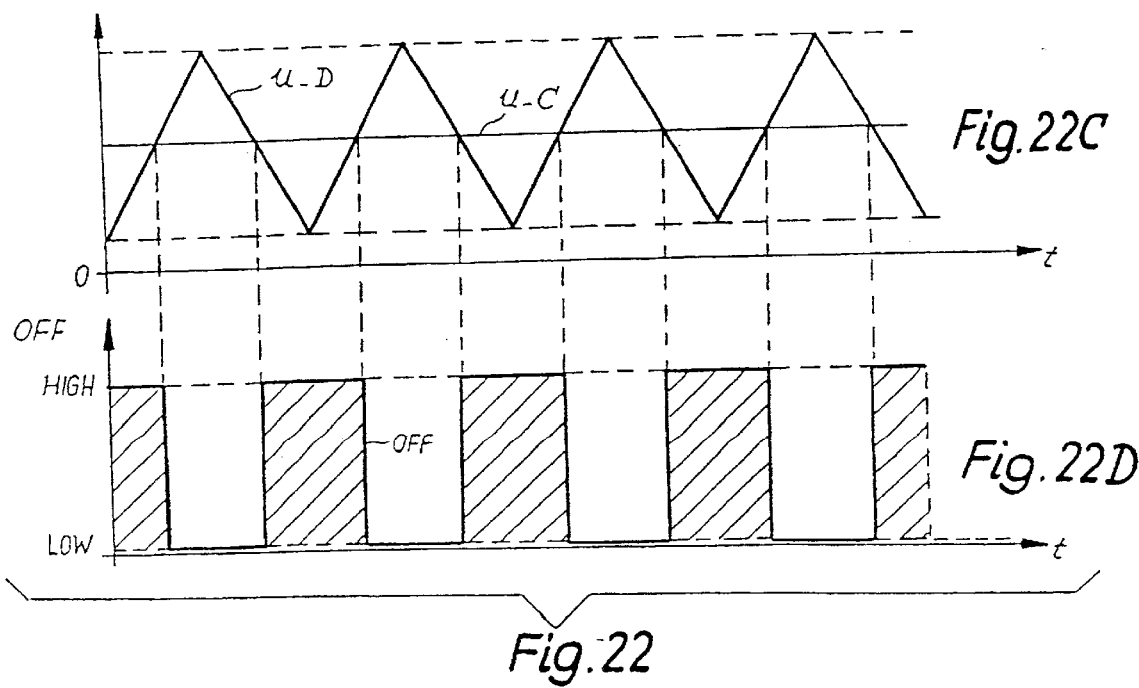
Fig. 22C
Fig. 22D
Fig. 22

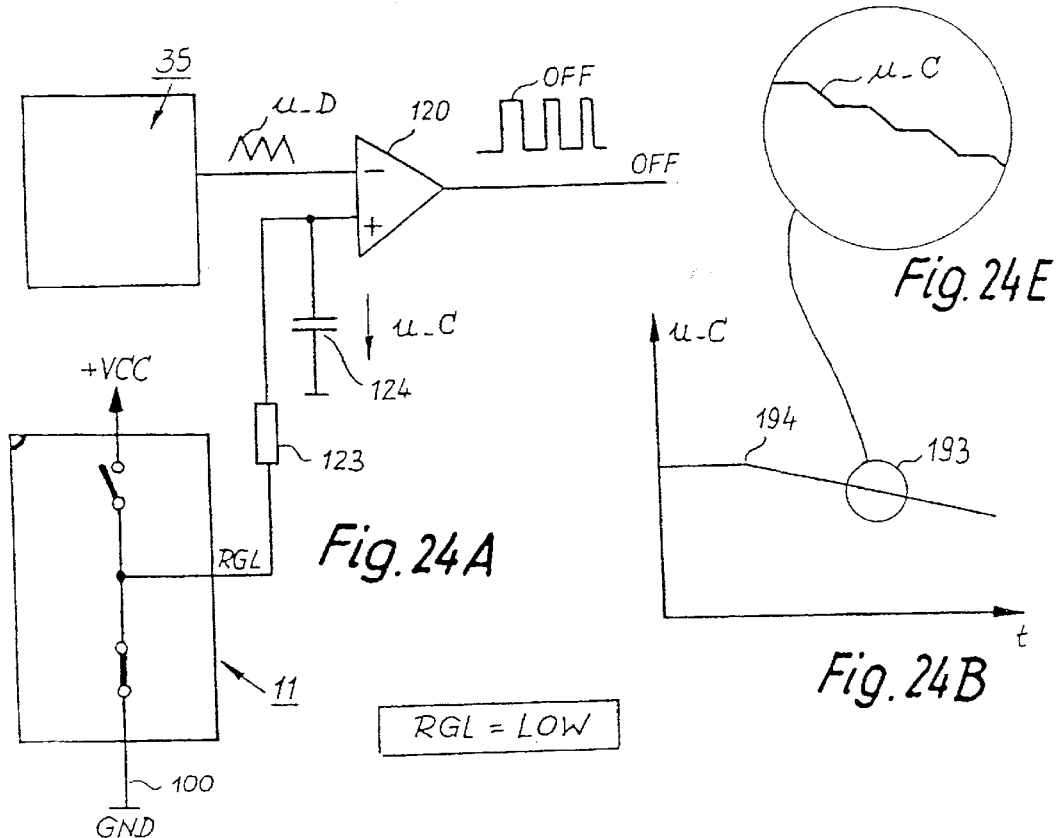
Fig. 24A
Fig. 24E
Fig. 24B
RGL = LOW
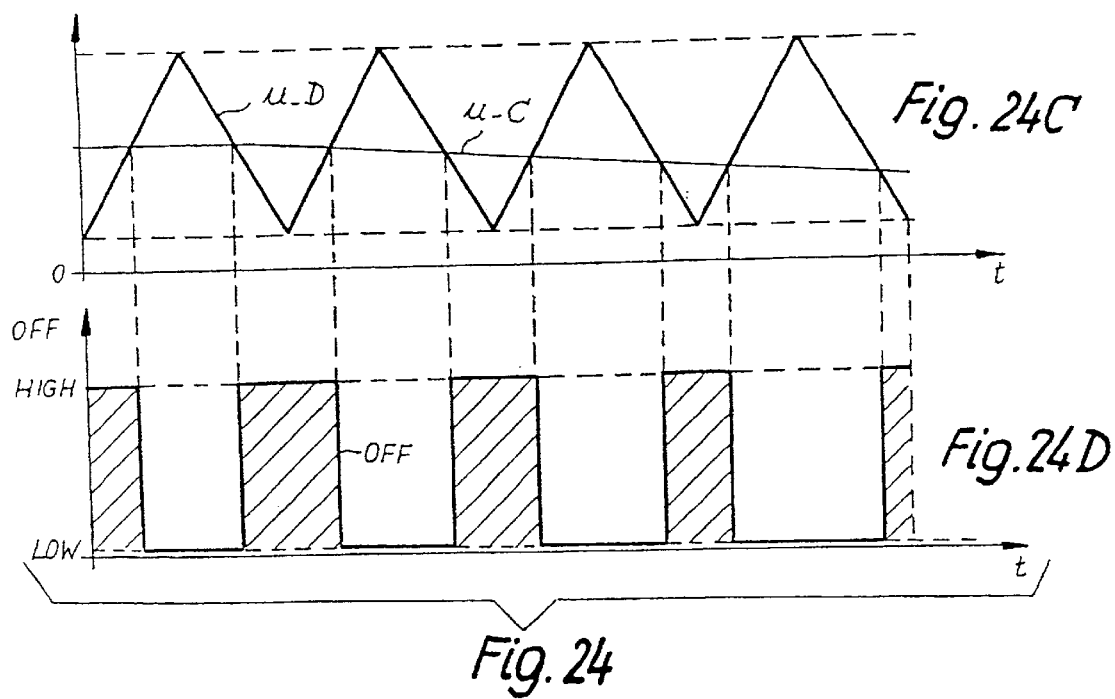
Fig. 24C
Fig. 24D
Fig. 24

ARRANGEMENT WITH AN ELECTRIC MOTOR

FIELD OF THE INVENTION

The invention concerns an electric motor and in particular an electric motor having a characteristic function.

BACKGROUND OF THE INVENTION

Examples of electronically commutated motors are described, for example, in the following documents of the Applicant:

DE 44 41 372 A1 [(internal: D183)]=U.S. Pat. No. 5,845,045 JESKE

EP 0 658 973 B1 [(internal: EP184)]=U.S. Pat. No. 5,590,235 JESKE

DE 296 06 939.6-U [(internal: D190i)]=EP 0 739 084 A2

DE 195 15 944 A1 [(internal: D192)]

EP 0 741 449 A1 [(internal: EP193)]=U.S. Pat. No. 6,163,117

EP 0 744 807 B1 [(internal: EP194)]=U.S. Pat. No. 5,847,523

DE 195 18 991 A1 [(internal: D195)] DIETERLE et al. (publ. Jan. 23, 1997)

DE 196 47 983 A1 [(internal: D199i)]=U.S. Pat. No. 6,091,887

EP 0 780 962 A2 [(internal: EP200)]

It would not be possible to reproduce the extensive content of these documents in the present application even in summarized form, and reference is therefore made to their complete contents.

In DE 44 41 372 A1 and corresponding U.S. Pat. No. 5,845,045, the rotation speed behavior of an electric motor is represented by a characteristic n=f(T), a setpoint speed n being associated with each temperature T. In the case of a fan, for example, the rotation speed can thus be increased as the temperature rises. The rotation speed/temperature behavior is determined, in this context, by analog components. The accuracy achievable here is not great, however, due to manufacturing tolerances in the components, and it is possible only with great effort to switch over to a different behavior.

SUMMARY OF THE INVENTION

It is therefore an object of the invention to make available a new electric motor and a method for operating such an electric motor.

According to a first aspect of the invention, this object is achieved by an electric motor having a rotation speed controlled by a changeable physical variable, in particular a temperature; having a characteristic field, stored in the form of individual digital values, for the allocation of values of said physical variable to corresponding rotation speed values of the electric motor; and having a microcontroller or microprocessor which has access to the stored individual digital values. An electric motor of this kind is very versatile, since because of the stored characteristic field its rotation speed behavior as a function of the changeable physical variable can easily be modified. It has proven particularly advantageous in this context to store the individual digital values at least partially in vector form, since this makes them substantially easier to process.

The invention additionally concerns a method for controlling a physical variable, in particular a rotation speed, having the following steps:

a) in order to ascertain the system deviation, a difference is determined between a desired value for the physical variable (in digital form), and an actual value for the physical variable (also in digital form);

b) the sign and absolute value of that difference are ascertained;

c) an analog memory element is charged or discharged, depending on the sign;

d) the duration of the charging or discharging operation is in each case substantially proportional to the magnitude of the ascertained absolute value of the difference;

e) a value dependent on the charge of the analog memory element is used to influence the pulse duty factor of an actuating member that in turn influences, with its output signal, the physical variable that is to be controlled.

The result is to create a highly advantageous combination of digital accuracy in ascertaining the system deviation, and subsequent processing of that system deviation in order to influence the physical variable.

A further way of achieving the stated object is provided by a method for temperature-dependent control of the rotation speed of an electric motor having the following steps:

a) value clusters of characteristic definition points are stored in a memory, said value clusters containing at least one value characterizing a specific temperature, and one rotation speed datum associated with that temperature;

b) a present value characterizing the temperature that controls the motor rotation speed is sensed at time intervals;

c) that sensed value is compared to the stored values that characterize the temperature and are contained in the stored value clusters;

d) a stored value adjacent to the present value is ascertained;

e) by way of an interpolation proceeding from that adjacent value, a rotation speed datum for the sensed present value is ascertained;

f) a value derived from that interpolated rotation speed datum is conveyed to the electric motor.

It is thereby possible, by storing a small number of value clusters, to define the rotation speed behavior of a motor as a function of temperature.

The invention furthermore concerns a method for A/D conversion in an arrangement having a voltage divider containing a temperature-dependent resistor, one tapping point of that voltage divider defining the potential at the one input of a comparator, and the potential at the other input of the comparator being determined by a capacitor that can be charged via a constantcurrent source, having the following steps:

a) first the capacitor is discharged;

b) then a measurement is made of the time required for the capacitor, as it is charged by the constant-current source, to reach the potential of the other input;

c) that time is used as an indication of the temperature of the temperature-dependent resistor.

A method of this kind can easily be implemented using a microcontroller which controls or regulates functions of an electric motor. That microcontroller can effect discharge of the capacitor in step a), and can provide time measurement as defined in step c), the overall result being a very simple method.

Another way of achieving the stated object is provided by an electric motor having discrete values, stored in a memory, which (in the form of support values) define a temperature/rotation speed characteristic, the discrete values being modifiable via a data connection to an input device arranged outside the electric motor. This makes possible simple adaptation of such a motor to different customer requirements.

A further way of achieving the stated object concerns a method for operating an electronically commutated motor having associated with it a microprocessor or microcontroller and a program associated therewith, that program serving to control a plurality of motor functions of different priorities, having the following steps:

a) a plurality of requestable routines necessary for operation of the motor are provided;

b) when a requestable routine is needed, a corresponding request signal for it is set;

c) a higher-level program function is used to check which requested routine has the highest priority, and that highest-priority routine is executed first;

d) following execution of that highest-priority routine, the request signal associated with that routine is reset.

A method of this kind makes very good use of the available computing capacity of a microprocessor or microcontroller, and makes it possible to repeat specific time-critical interrogations or the like at intervals which do not exceed a predefined duration. These can be, for example, interrogations of a data bus by means of which data or instructions can be conveyed to the motor. This method is preferably continuously repeated, in the manner of a loop, while the motor is operating, the loop sequences being different depending on the type of routine requested. It is particularly advantageous in this context if a requestable routine to be executed in the program can in turn generate, during its execution, a request signal for another requestable routine to be executed. This allows close concatenation of routines, between each of which time-critical program steps can be executed.

A further way of achieving the stated object concerns a motor having a microprocessor or microcontroller and a bus, in which the microprocessor or microcontroller controls both the bus and the motor. A motor of this kind is very inexpensive due to the reduction in electronic components, and the elimination of further electronic components moreover makes possible a compact design for the motor. Because the entire control system of the motor is displaced into the microprocessor or microcontroller, it is possible to make changes to the motor merely by changing the software.

Further details and advantageous developments of the invention are evident from the exemplary embodiments which are described below and depicted in the drawings—and which are to be understood in no way as a limitation of the invention.

BRIEF FIGURE DESCRIPTION

FIG. 12 is a table of the definition points of the characteristic from FIG. 11;

FIGS. 22A through 22D illustrate the control process for a motor at the correct rotation speed;

FIGS. 24A through 24E illustrate the control process for a motor at too high a rotation speed;

DETAILED DESCRIPTION
OVERVIEW OF THE CHARACTERISTIC FUNCTION

Figure 1:
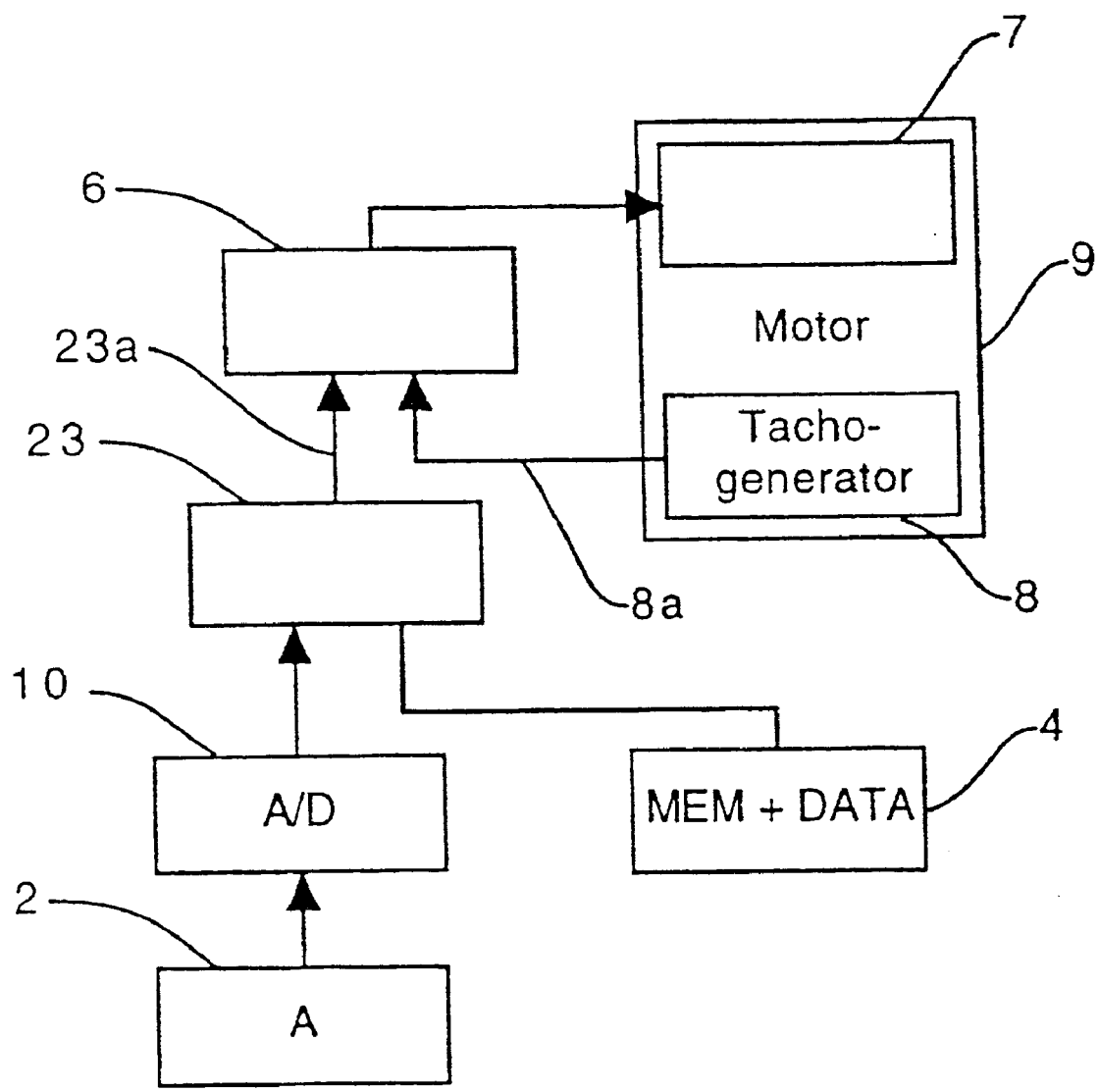
FIG. 1 is a schematic diagram of an arrangement according to the present invention.

FIG. 1 is a schematic depiction of an arrangement according to the present invention. A driver 7 of a motor 9 is controlled by a rotation speed controller 6. Controller 6 receives an actual value 8a for the rotation speed of motor 9 from a tacho-generator 8, and receives a setpoint 23a from a characteristic function 23. Characteristic function 23 calculates a setpoint 23a for rotation speed controller 6 on the basis of an originally analog variable A 2 that is converted to digital by an A/D converter 10, with the aid of support values of a "MEM+DATA" characteristic that are stored in a memory 4; those values not predefined by the support values are calculated by interpolation.

OVERVIEW OF THE ELECTRIC MOTOR

Figure 2:
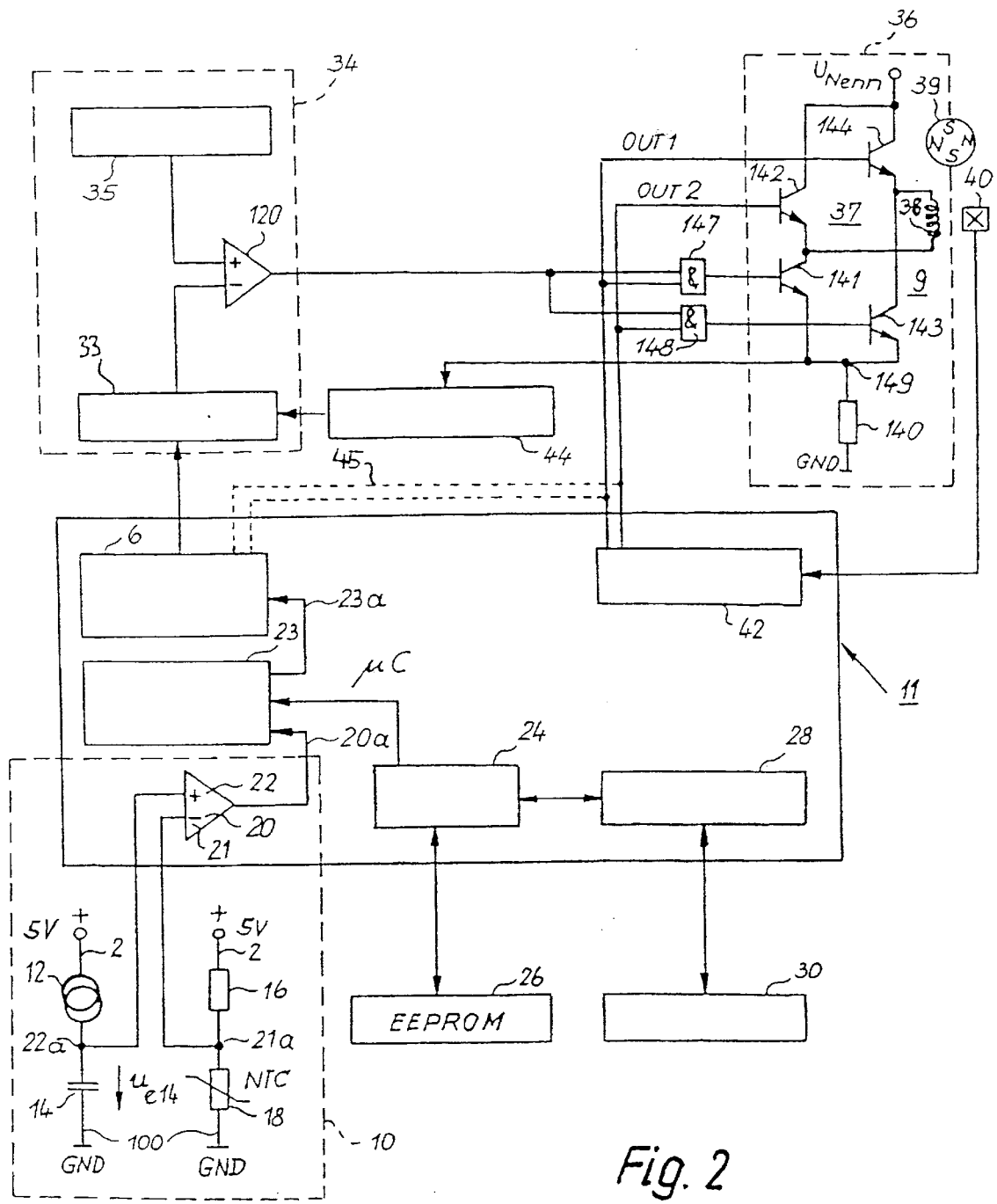
FIG. 2 is an exemplary depiction of an embodiment of the invention.

FIG. 2 shows an overview of a preferred exemplary embodiment of an electric motor according to the present invention. That motor is controlled by a microcontroller ($\mu$C) 11. Analog-digital converter (A/D converter) 10 is configured using a comparator 20 located in $\mu$C 11, and makes possible digitization of the temperature detected via an NTC resistor 18. Comparator 20 has a negative input 21 (hereinafter also referred to as CP− or CMPIN−), and has a positive input 22 (hereinafter also referred to as CP+ or CMPIN+). These inputs can be controlled by the program of μC 11, as will be described below.

A constant resistor 16 is connected in series with NTC (Negative Temperature Coefficient) resistor 18 between a positive line 2 and ground (GND) 100. Their connection point 21a is connected to negative input 21.

A constant-current source 12 is also connected in series with a capacitor 14 between positive line 2 and ground 100, and their connection point 22a is connected to positive input 22 of comparator 20.

The potential at negative input 21 is determined by the temperature at NTC resistor 18, whose resistance decreases with increasing temperature, so that said potential drops with increasing temperature.

The potential at positive input 22 is determined by voltage $u_{C14}$ at capacitor 14. When positive input 22 is connected under program control to ground 100, $u_{C14}$ becomes zero; and when positive input 22 is then switched over to a high-resistance state ("tristate"), capacitor 14 is charged via constant-current source 12 with a constant current, so that $u_{C14}$ rises linearly.

When the potential at point 22a has reached the potential at point 21a, capacitor 20 is switched over to HIGH at its output 20a. The time required for capacitor 14 to charge—starting from $u_{C14}$=0 V until the switchover of output 20a to HIGH—is therefore an indication of the temperature. That time is converted in μC 11, in accordance with a selectable characteristic, into a setpoint for the rotation speed of motor 9.

Characteristic function 23 serves this purpose. It determines motor rotation speed setpoint 23a from the temperature value digitized by A/D converter 10. It obtains for that purpose, by way of an EEPROM function 24, parameter values from a nonvolatile memory, in this case an EEPROM 26. EEPROM 26 can obtain values for a new characteristic via a communication function 28 and a bus interface 30, in order to change the temperature behavior of the motor. EEPROM is an acronym for Electrically Erasable Programmable Read Only Memory.

Characteristic function 23 forwards the ascertained rotation speed setpoint 23a to rotation speed controller 6, which controls current flow to the motor. This can be done, for example, via a control system of a pulse-width modulation (PWM) generator 34, or a block control system 45. Regarding the block control system, reference is made, by way of example, to DE 44 41 372.6 and corresponding U.S. Pat. No. 5,845,045.

Figure 19:
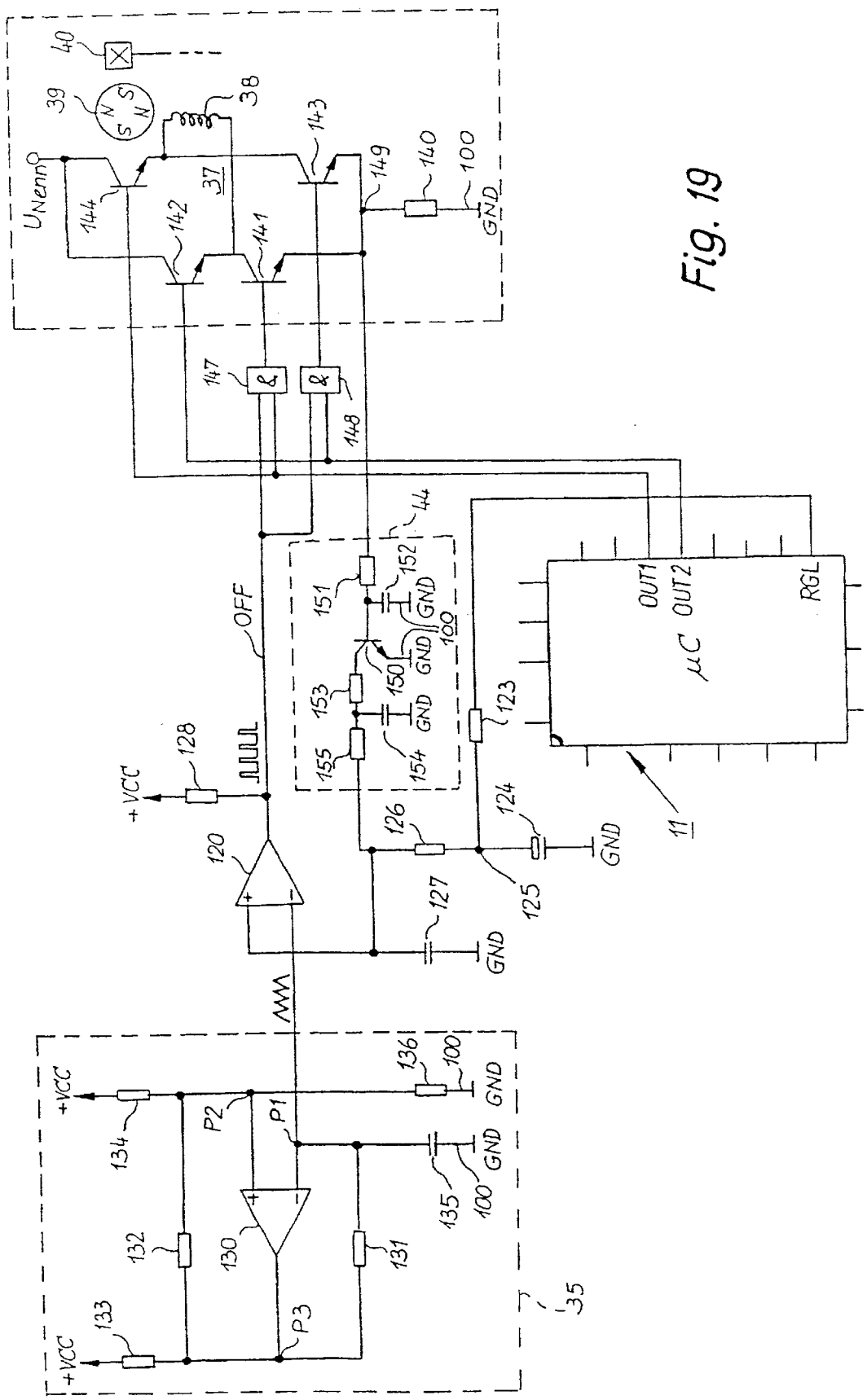
FIG. 19 is a circuit diagram with portions important for controlling and driving the electric motor.

PWM generator 34 has an actuating signal 33 controlled by the rotation speed controller, a triangular signal generator 35, and a comparator 120. Reference is made to FIG. 19 regarding the function of an exemplary PWM generator 34.

As a simple example, FIG. 2 depicts an electronically commutated motor 9 having a single phase 38. Current flows to this phase 38 through a transistor output stage 36, here in the form of a complete bridge 37. A Hall generator 40 supplies a drive function 42 with information about the instantaneous position of rotor 39. Drive function 42 ensures correct commutation of motor 9, and safe operation (e.g. if motor 9 is overloaded).

A current limiter 44 reduces the flow of current to output stage 36 if the current in the single phase 38 becomes too high, for example during motor startup.

Preferred values for the electronic components used in the individual Figures are indicated at the end of the specification, and the reader is referred thereto.

Figure 3:
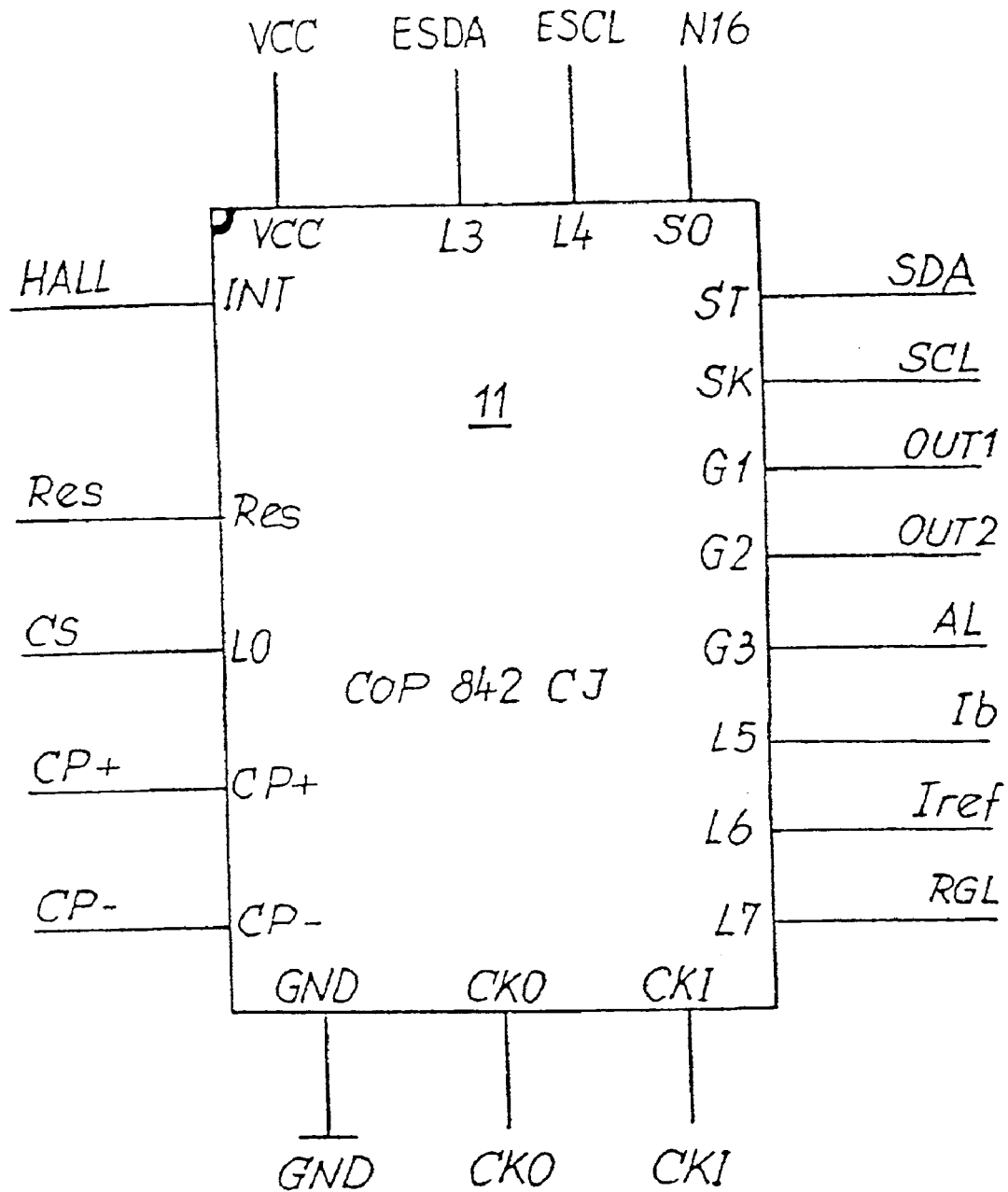
FIG. 3 shows the pin assignment of the COP 842 CJ microprocessor.

FIG. 3 shows the pin assignment of microcontroller (μC) 11—model COP 842 CJ of National Semiconductor—used in the exemplary embodiment. The designations inside μC 11 correspond to the manufacturer's designations; the outer designations on each line indicate the references used principally in the application. To identify its position, a black quarter-circle is inscribed at the top left and is also shown in the figures which follow.

Figure 4:
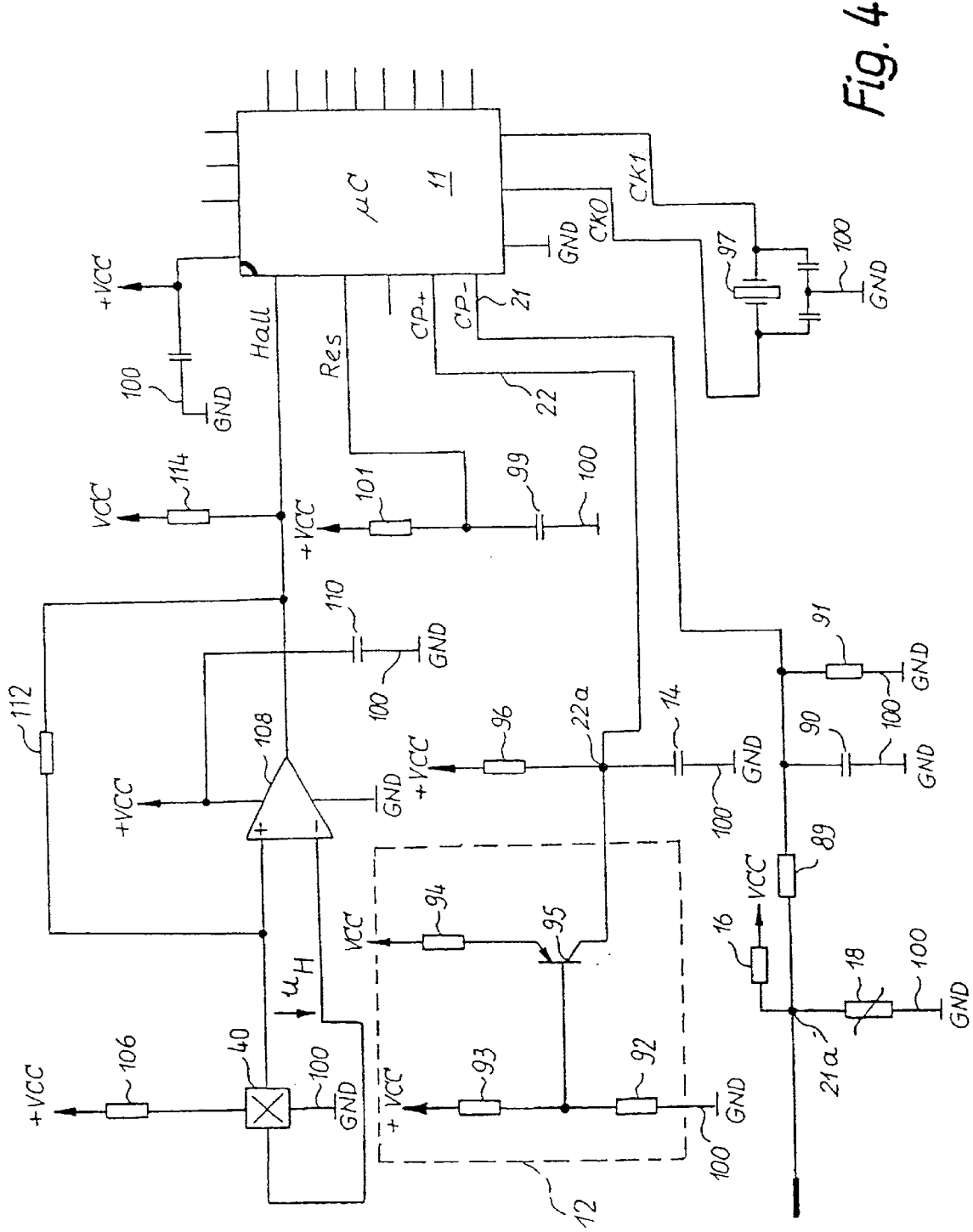
FIG. 4 is a circuit diagram which shows the components for A/D conversion and for processing of the Hall signal.

FIG. 4 shows a detailed circuit diagram of A/D converter 10 (FIGS. 1 and 2) with the components for A/D conversion and for processing of the Hall signal from Hall sensor 40. The Hall signal supplies the actual value of the motor rotation speed.

An oscillator crystal 97, which is connected to terminals CK0 and CK1 (cf. FIG. 3) of μC 11, defines its clock frequency (e.g. 10 MHz). Reset input Res (FIG. 3) is connected via a capacitor 99 to ground 100 and via a resistor 101 to +Vcc. These two components generate a power-up reset at startup in the usual way.

Hall generator 40, e.g. model HW101A, is connected via a resistor 106 to +Vcc to supply current, and to ground 100. Its output signal $u_H$ is conveyed to the two inputs of a comparator 108 (e.g. LM2901D) which has a filter capacitor 110 associated with its Vcc input. The output of comparator 108 is connected via a feedback resistor 112 to the positive input of comparator 108, and via a "pullup" resistor 114 to +Vcc. The output of comparator 108 is also connected directly to the Hall port (FIG. 3) of microprocessor 11, so that a Hall signal controlled by rotor magnet 39 is obtained there. That signal always has a value HALL=0 during one rotor rotation of 180° el., and a value HALL=1 during the next rotation of 180° el. Analysis thereof is explained below with reference to FIG. 17. Each change from HALL=1 to HALL=0 or vice versa results in an interrupt operation in μC 11.

NTC resistor 18 of A/D converter 10 is connected at one end to ground 100. At its other end, it is connected to resistor 16 which is connected at its other end to +Vcc. Connection 21a between NTC resistor 18 and resistor 16 is connected via a protective resistor 89 and a filter element (comprising a capacitor 90 and a resistor 91) to output CP− (FIG. 3) of μC 11. Capacitor 14 is connected at one end to ground 100, and at its other end to a resistor 96 which in turn is connected to +Vcc. Connection 22a between capacitor 14 and resistor 96 is connected to constant-current source 12 and to input CP+. Constant-current source 12 has a pnp transistor 95 (e.g. BC8568) whose base voltage is defined by resistors 92 and 93 and whose current on the emitter side is limited by a resistor 94.

A/D CONVERTER

Figure 5:
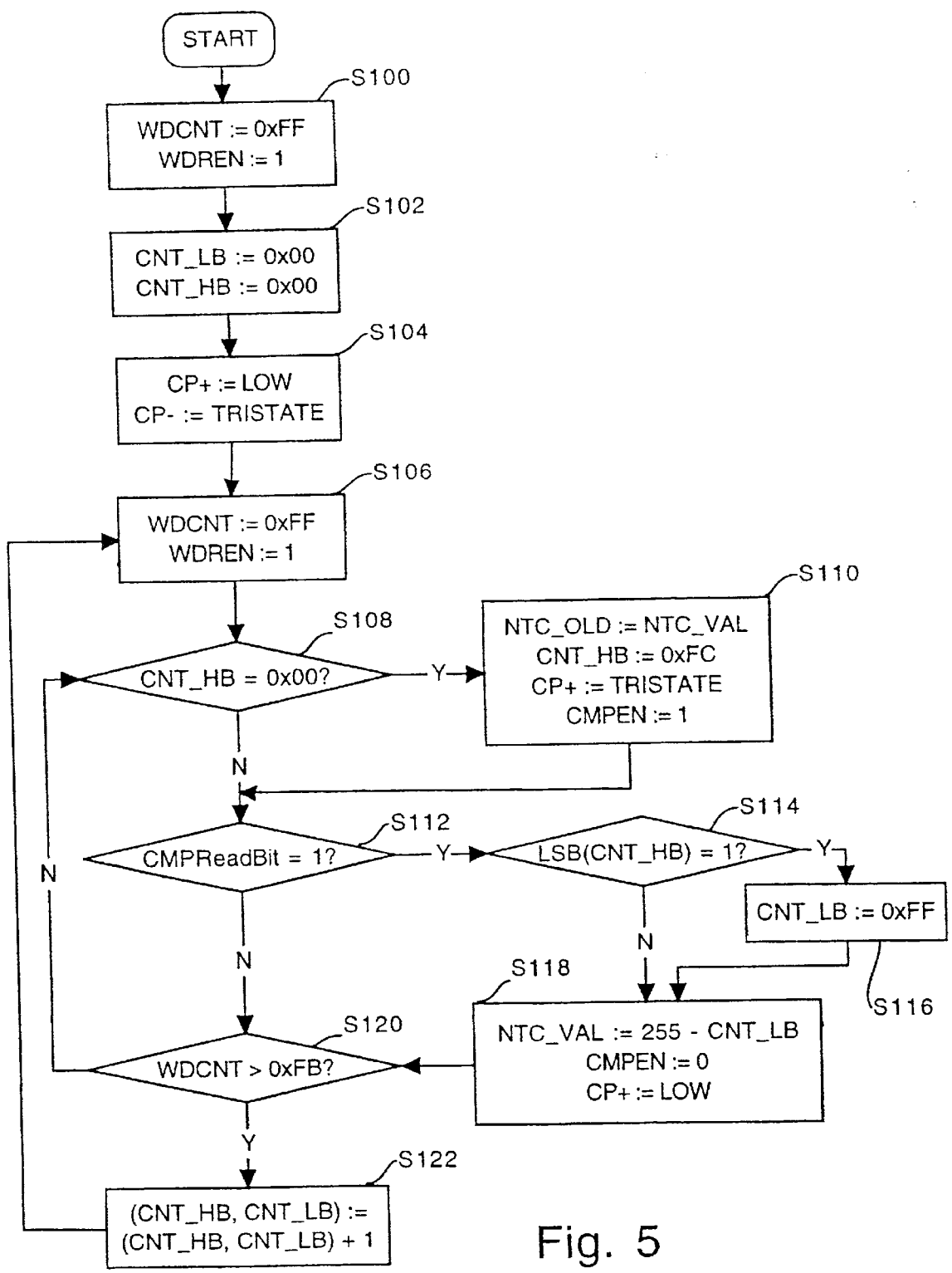
FIG. 5 is a flow chart for A/D conversion.

FIG. 5 is a flow chart for the A/D converter.

In step S100 of FIG. 5, a watchdog timer WDCNT 79 (FIG. 6) of μC 11 is loaded with a hexadecimal value 0xFF (hexadecimal values are identified by a "0x" prefix), and started by setting bit WDREN to 1. Watchdog timer WDCNT 79 is operated in a mode in which it decrements its value at fixed time intervals, and triggers an internal reset in μC 11 when it reaches zero. To prevent this reset, watchdog timer WDCNT 79 must be periodically reloaded by the program. This yields increased reliability, since μC 11 is not reloaded if, for example, the program crashes; it therefore automatically experiences a reset and then restarts (watchdog function).

In S102, the two counter registers CNT_LB 82 and CNT_HB 81 (FIG. 6) are set to zero.

Inputs CP− and CP+ of comparator 20 (cf. FIG. 2 and FIG. 3) are configured in S104. CP+ is set to LOW (ground), so that capacitor 20 is discharged. CP– is set to TRISTATE, so that a voltage determined by resistor 16 and NTC resistor 18 is present at CP–. The TRISTATE state of a port means that the port is governed neither by +Vcc nor by ground 100, but rather is isolated.

The main loop constituted using watchdog timer WDCNT 79 begins in step S106. Watchdog timer WDCNT 79 is loaded (as in step S100) with the value 0xFF, and started with WDREN:=1. After steps S108 through S118 described below have been run through, step S120 checks whether watchdog timer WDCNT 79 has yet reached a value 0xFB, i.e. has been decremented four times. If so (Y=YES), then counter CNT80 constituted from the two bytes CNT_LB 82 and CNT_HB 81, which can be represented as (CNT_HB, CNT_LB) (cf. FIG. 6), is incremented in S122 and execution jumps back to S106. If it was found in S120 that watchdog timer WDCNT 79 was greater than 0xFB, a jump back to S108 takes place. Since watchdog timer 79 decrements at 256-µs intervals, these four decrement steps to 0xFB correspond to a time of 1024 µs. Counter CNT80 constituted from CNT_LB 82 and CNT_HB 81 thus has a resolution of 1024 µs=1.024 ms.

Figure 6:
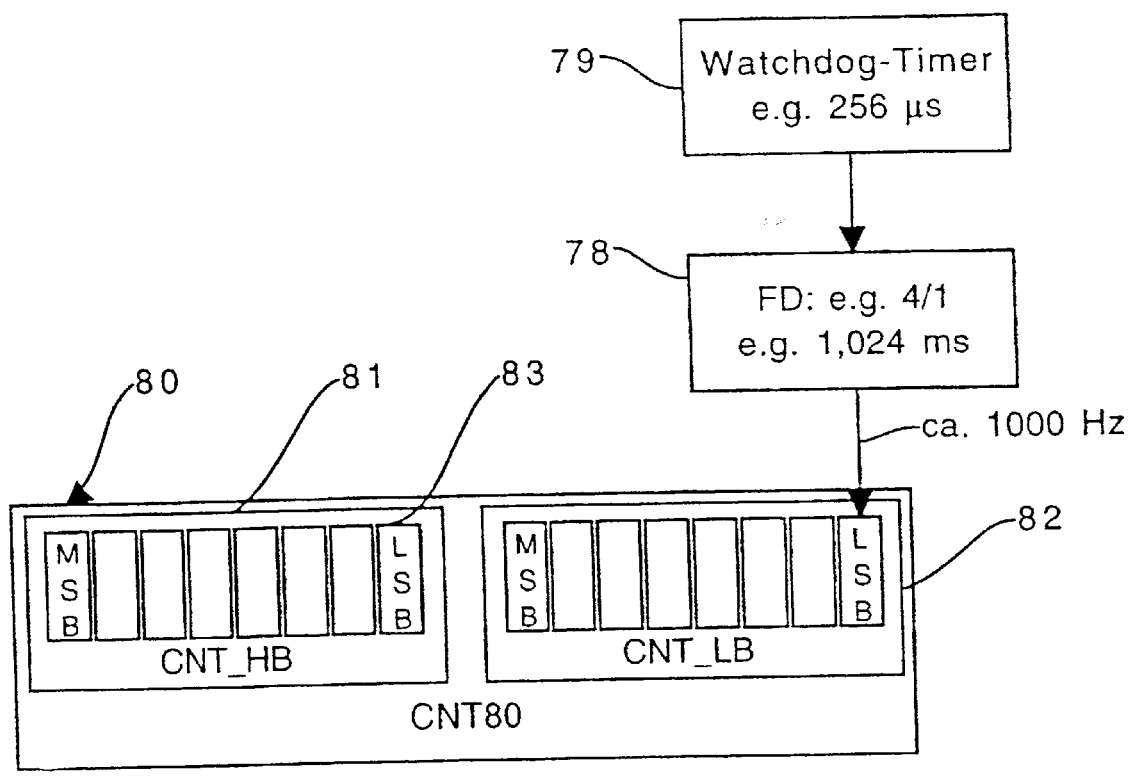
FIG. 6 shows the configuration of a counter used for A/D conversion.

FIG. 6 schematically shows, in this context, the construction of counter CNT80 constituted from CNT_LB 82 and CNT_HB 81. The two 8-bit counters CNT_HB 81 and CNT_LB 82 are used together as 16-bit counter CNT80; CNT_LB 82 is the low byte, and CNT_HB 81 is the high byte. The least significant bit of each byte is in each case labeled LSB, and the most significant bit MSB. Each byte has eight bits.

Watchdog timer WDCNT 79 decrements, for example, by 1 every 256 µs. As a result of the, for example, 4:1 frequency division in S106 and S120 (FIG. 5), counter CNT80 is incremented every 1.024 ms. This corresponds to a frequency of approximately 1000 Hz. If an overflow occurs during the incrementing of CNT_LB 82 (i.e. CNT_LB 82 has a value 0xFF and is incremented), CNT_LB 82 then acquires a value 0x00, and an overflow bit (carry bit) is set. After the incrementing of CNT_LB 82, a zero is added to CNT_HB 81 to account for the carry bit; in other words, CNT_HB 81 is incremented at every 256th increment of CNT_LB 82, and CNT_HB 81 thus has a resolution of approx. 256 ms and therefore can represent a maximum time value of approx. 65.5 seconds. Counter CNT80, which is made up of the two 8-bit counters CNT_HB 81 and CNT_LB 80, thus functions as a 16-bit counter which is incremented by 1 after every four decrement steps of watchdog timer WDCNT 79.

Although CNT_LB 82 and CNT_HB 81 together act as a counter CNT80, they have several different functions:

In A/D conversion, CNT_LB 82 acts as a counter for the time required for capacitor 14 to charge, via transistor 95, to the point that the voltage at CP+ 22 is as high as the voltage (temperature-dependent via NTC resistor 18) at CP– 21; in other words, its count is an indication of the temperature of NTC resistor 18.

CNT_HB 81 serves as a counter for the time between successive A/D conversions. That time can be set, for example, to one second.

The least significant bit (LSB) 83 of CNT_HB 81 additionally serves as an indicator of an overflow of CNT_LB 81 during A/D conversion.

Steps S108 through S120 that are executed in the lower portion of the watchdog timer loop (FIG. 5) are described below.

S108 checks whether CNT_HB has a value 0x00, If so, then in S110 the previous NTC value NTC_VAL is saved in NTC_OLD; CNT_HB is set to 0xFC; CP+ 22 is set to TRISTATE so that capacitor 14 is charged via transistor 95 (FIG. 4) (connected by way of resistors 92, 93, and 94 as a constant-current source) and thus allows the voltage at CP+ 22 to rise linearly; and comparator 20 is started with CMPEN:=1. After the changeover of CNT HB to 0x00, register CNT LB also has a value 0x00, so that it acts as a counter for the time required for the voltage present at CP+ 22 to equal the voltage present at CP– 21.

The operation of setting register CNT_HB to 0xFC defines the time between the individual A/D conversions. Since register CNT_HB has a resolution of approx. 256 ms, a new A/D conversion is performed after every four increments (0xFC to 0xFD to 0xFE to 0xFF to 0x00), i.e. after approximately one second. A value other than 0xFC can be selected, but it must be greater than 0x00 so as not to start a new A/D conversion immediately; and its least significant bit 83 (FIG. 6) must be 0 so that it can be used as an indication of an overflow of CNT_LB 82 during the A/D conversion.

Until the voltage at CP+ 22 (defined by capacitor 14 charged by constant-current source 12 (FIG. 4)) has reached the voltage at CP– 21 that is temperature-dependent on NTC resistor 18, execution cycles through S108 and S112 in the lower part of FIG. 5 without executing additional steps. When the voltage at CP+ 22 equals the voltage at CP– 21, the comparator switches its comparator read bit (CMPReadBit) to HIGH, and execution branches from the comparison in S112 to S114.

S114 checks, based on least significant bit (LSB) 83 of CNT_HB 81, whether an overflow of CNT_LB 82 has taken place during the A/D conversion. The value range 0x00 to 0xFF of CNT_LB 82 is intended to be utilized as completely as possible for D/A conversion. It may therefore happen, within the production tolerances of the comparator circuit, that an overflow still takes place for values in the upper range (i.e. at low temperatures). That overflow can be detected because least significant bit 83 has acquired a value of zero when CNT_HB 81 is set in S110. If an overflow of CNT_LB has occurred, least significant bit 83 of CNT HB 81 then has a value of 1. If so, CNT_LB is then assigned the maximum value 0xFF in S116; otherwise execution branches from S114 directly to S118.

In S118, the value of CNT_LB is inverted and is stored in register NTC_VAL. Inversion converts CNT_LB to a value of (255–CNT_LB), so that now a small NTC value NTC_VAL corresponds to a low temperature, and a large NTC_VAL to a high temperature. The comparator is stopped by CMPEN:=0, and CP+ 22 is set to LOW so that capacitor 14 is discharged before the next A/D conversion, which takes place when CNT_HB has reached a value of zero.

Figure 7:
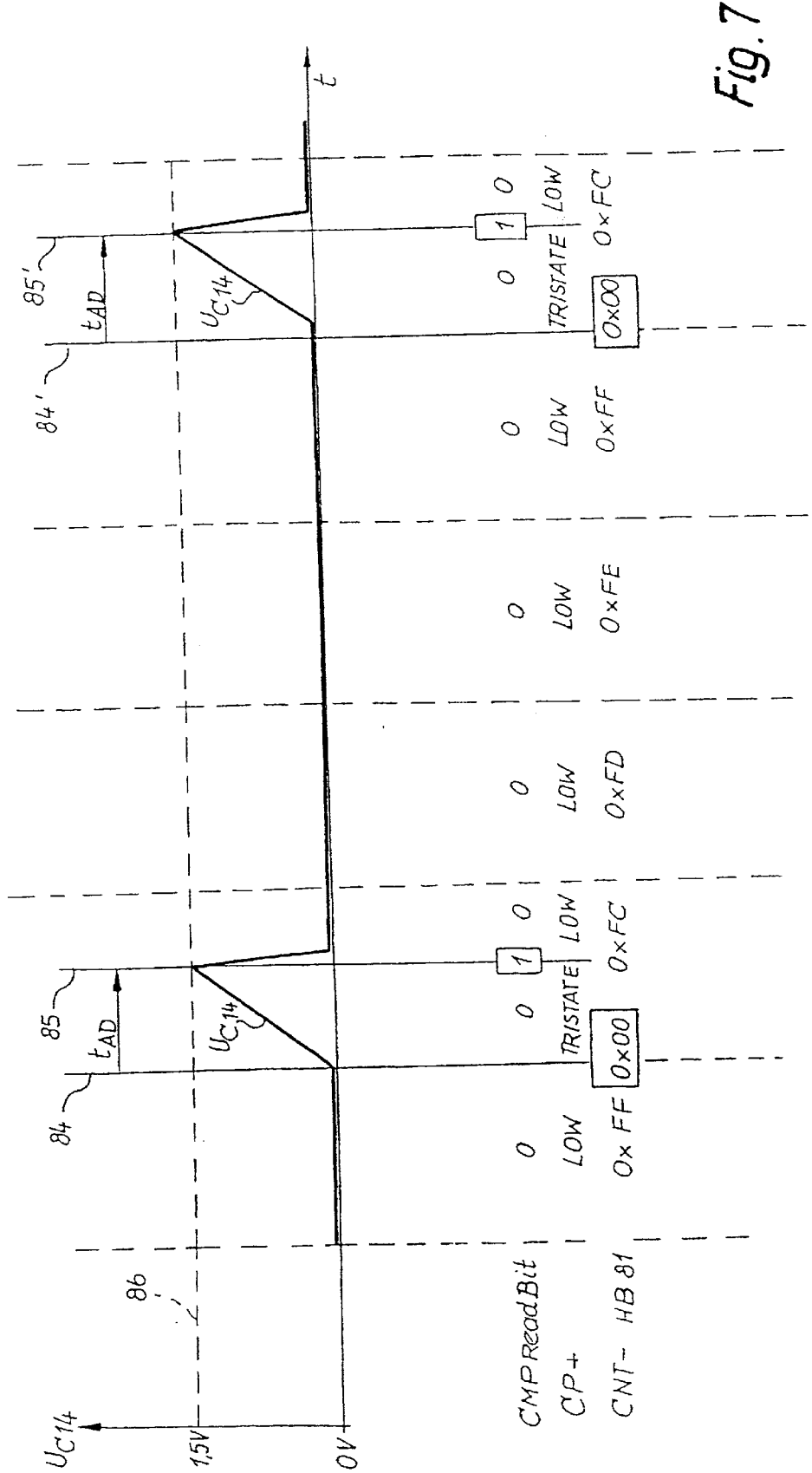
FIG. 7 is a time diagram for the A/D conversion sequence.

FIG. 7 is a time diagram for the A/D converter. CNT_HB 81 serves as a counter for the time between the individual A/D conversions. It initially has a value of 0xFF, and CP+ is LOW (i.e. capacitor 14 is discharged).

At time 84 or 84', CNT_HB 81 kicks over to 0x00, thus starting the A/D conversion. CNT_HB 81 is set to 0xFC in order to define the time period until the next A/D conversion, and CP+ is set to TRISTATE in order to allow capacitor 14 to charge.

At time 85 or 85', voltage $U_{C14}$ of capacitor 14 equals potential 86 at node 21a, and variable CMPReadBit changes its state from 0 to 1. A check is now made as to whether an overflow of CNT_LB 82 has occurred; comparator 20 (FIG. 2) is switched off; and CP+ is switched to LOW, so that capacitor 14 is once again discharged. The next A/D conversion takes place when CNT_HB increments from 0xFF to 0x00, i.e. at time 84'.

HYSTERESIS AND SENSOR BREAKDOWN FUNCTION

The actual calculation of the rotation speed setpoint by the characteristic function is preceded by a hysteresis and sensor breakdown function.

Figure 8:
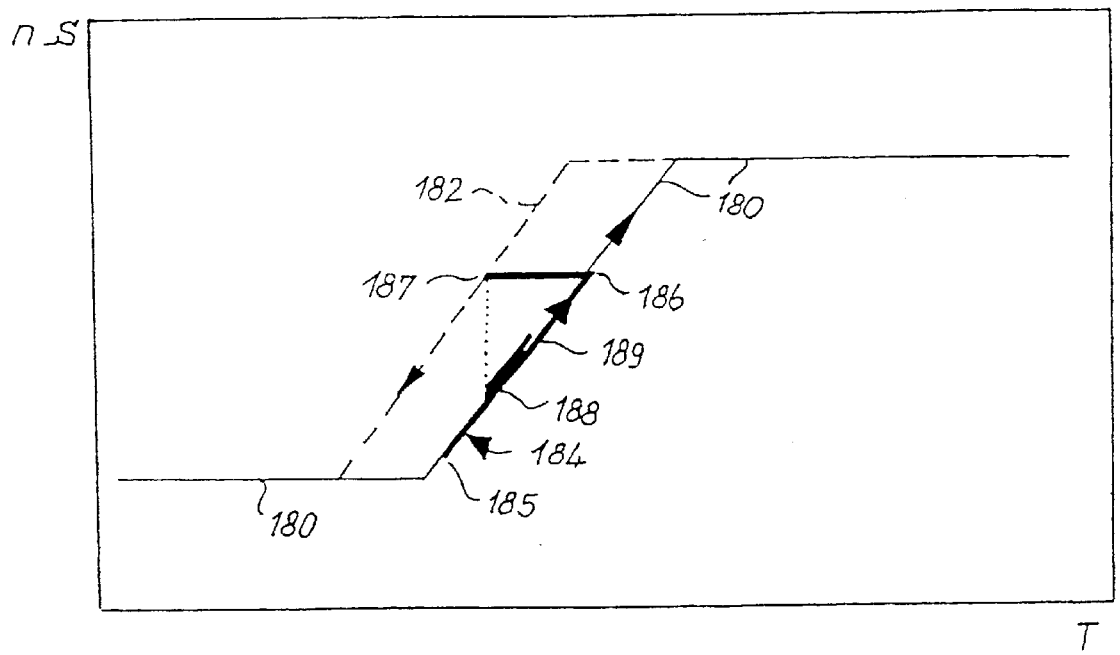
FIG. 8 shows a characteristic with hysteresis.

FIG. 8 shows a characteristic 180 (thin solid line) with hysteresis 182 (thin dashed line), in which a sample curve 184 for temperature and rotation speed setpoint is plotted (thick solid line).

As temperature T increases, rotation speed setpoint n_s changes from point 185 along the solid characteristic 180 to point 186.

As the temperature decreases, the rotation speed setpoint remains constant until the dashed hysteresis curve is reached at point 187. The rotation speed setpoint then drops to the rotation speed setpoint defined for that temperature by the solid characteristic, at point 188.

As the temperature rises, the rotation speed setpoint changes along characteristic 180 from point 188 to point 189, where the sample curve 184 ends. The hysteresis thus counteracts any oscillation in rotation speed, since as the temperature decreases, the rotation speed is not reduced until the temperature has decreased by a specific minimum value.

Figure 9:
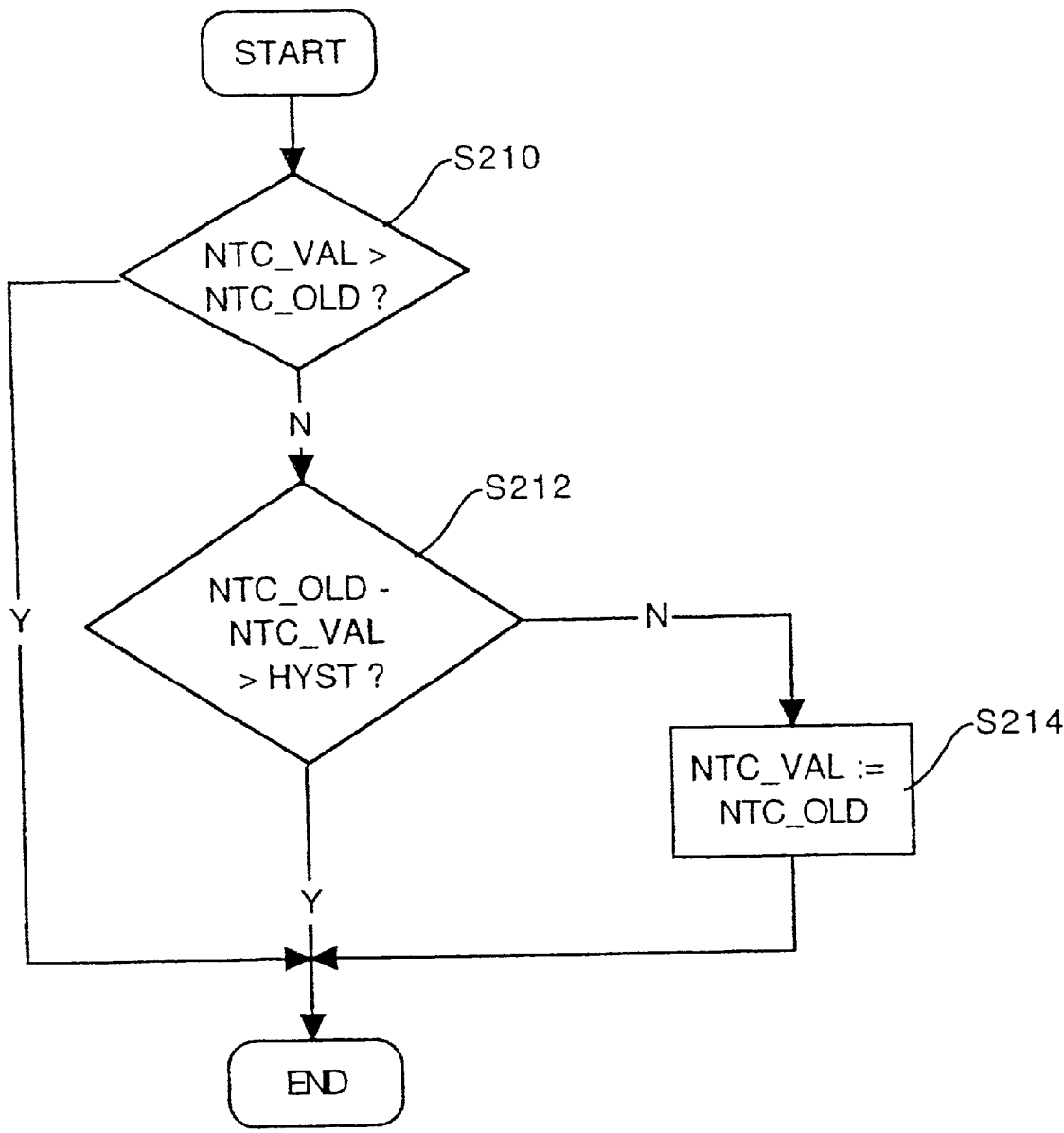
FIG. 9 is a flow chart for a hysteresis function.

FIG. 9 shows the hysteresis flow chart. Hysteresis is achieved by comparing the temperature value NTC_VAL digitized by the A/D converter to the previous (and previously stored) value NTC_OLD. If NTC_VAL is greater than NTC_OLD, it is used to calculate rotation speed setpoint n_s (S210), since the temperature has increased. If the response is No, then in step S212 NTC_VAL is subtracted from NTC_OLD. If the difference is greater than a hysteresis value HYST, the hysteresis routine ends and execution continues with the value NTC_VAL (S212). Otherwise the old value NTC_OLD is assigned to the value NTC_VAL (S214). The hysteresis value HYST can be loaded into the RAM region of $\mu$C 11 when the motor is configured, and can thus be programmed as desired. The hysteresis function allows the motor to change speed quietly.

Figure 10:
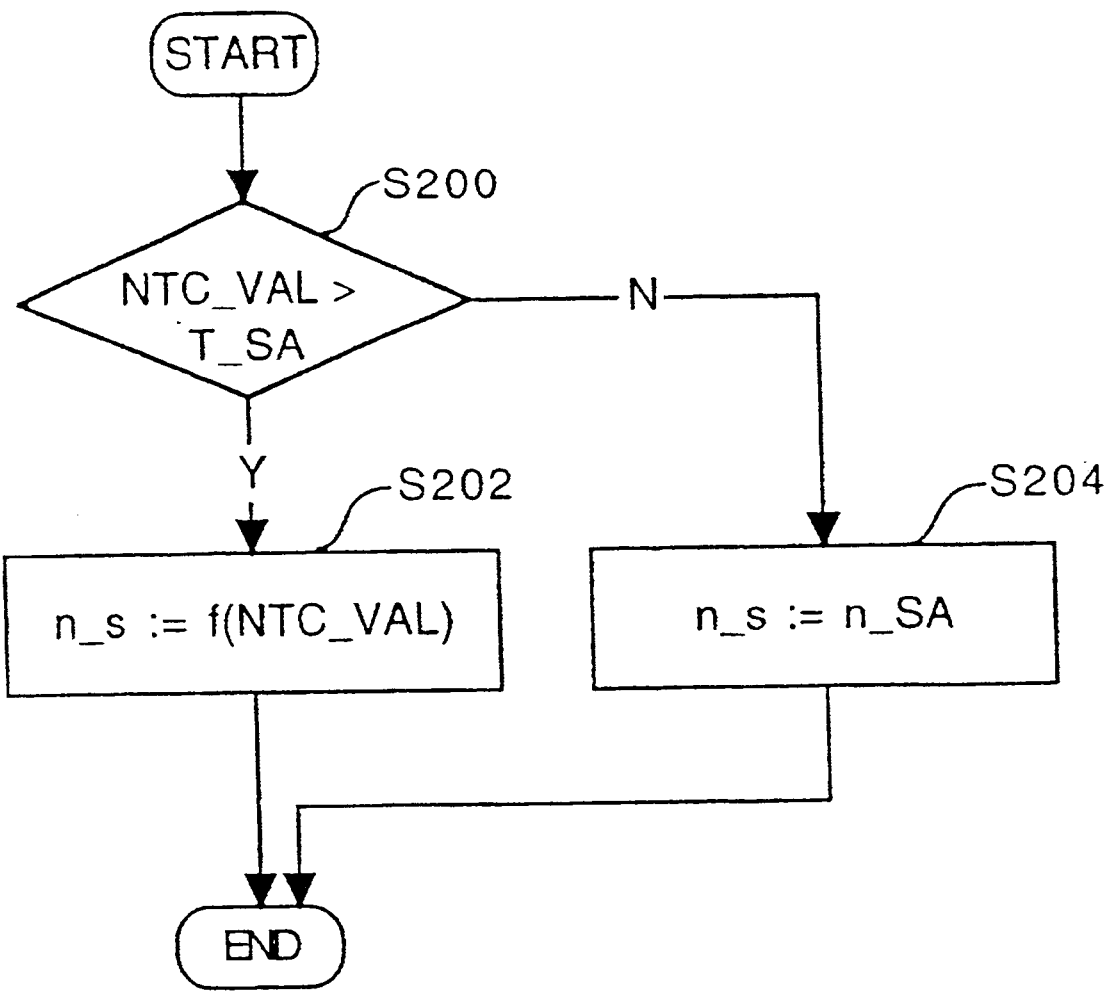
FIG. 10 is a flow chart for a sensor breakdown function.

FIG. 10 is a flow chart of a sensor breakdown function. The sensor breakdown function is a safety function that, in the event of damage to NTC resistor 18 (FIG. 4) or its connections (called a "sensor breakdown"), defines a so-called sensor breakdown rotation speed as the rotation speed setpoint. For example, if the NTC resistor is defective and has a resistance equal to infinity, a very small NTC value NTC_VAL is obtained. A sensor breakdown temperature value T_SA is therefore defined, and for any NTC value NTC_VAL that is less than T_SA, it is assumed that a sensor breakdown exists.

In S200, the NTC value NTC_VAL obtained from the A/D conversion described above is compared to the sensor breakdown temperature value T_SA, which is also 1 byte long (e.g. T_SA:=0 x38). If NTC_VAL is greater, calculation of rotation speed setpoint n_s is continued as described in the Figures which follow (S202). If NTC_VAL is less, however (i.e. if a sensor breakdown exists), the entire rotation speed calculation is skipped, and a sensor breakdown rotation speed n_SA (S204), usually the motor's maximum rotation speed, is used for rotation speed setpoint n_s.

The values T_SA and n_SA are loaded into the RAM region of $\mu$C 11 when the motor is configured, and can thus be programmed as desired.

CHARACTERISTIC FUNCTION

The NTC value NTC_VAL ascertained by A/D conversion is now converted into a rotation speed setpoint.

Figure 11:
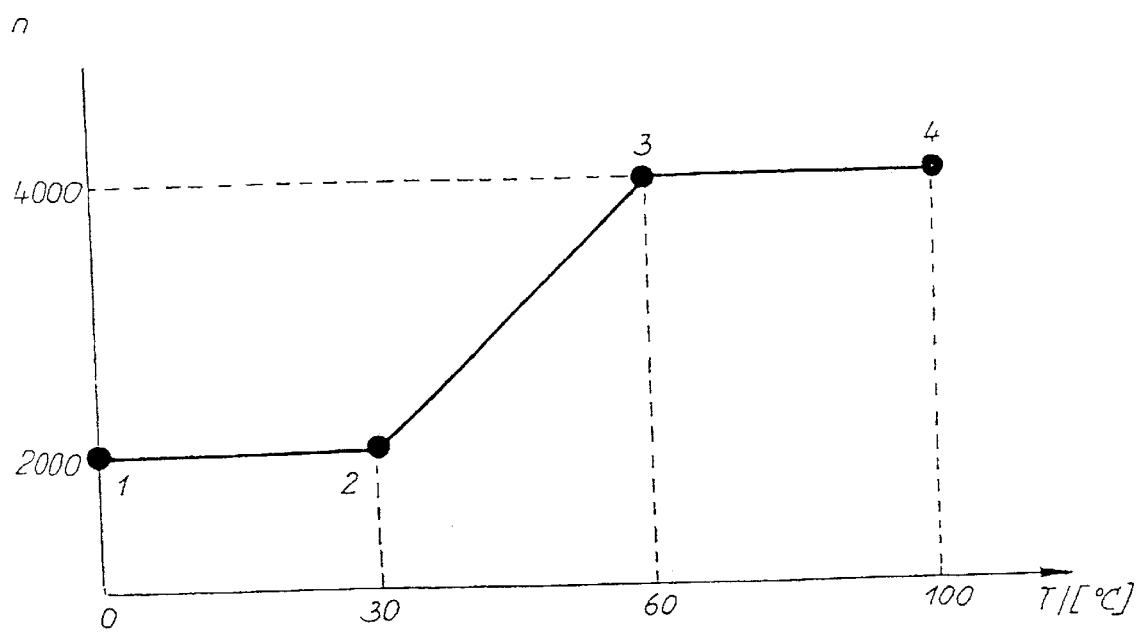
FIG. 11 shows a sample definition for a characteristic having four definition points.

FIG. 11 shows, by way of example, a characteristic n=f(T) defined by four characteristic definition points (solid circles numbered 1 through 4). For example, a temperature of 0° C. (point 1) corresponds to a rotation speed of 2000 rpm, as does a temperature of 30° C. (point 2). A temperature of 60° C. (point 3) corresponds to 4000 rpm, as does a temperature of 100° C. (point 4). In this exemplary embodiment, there is linear interpolation between temperature/rotation speed points 1, 2, 3, and 4. Microcontroller 11 calculates the necessary intermediate points.

Defining a characteristic using only a few characteristic definition points saves a great deal of memory and allows the characteristic to be easily changed by storing points with new values. If a sensor breakdown function is used, the definition point with the lowest temperature is selected as the temperature T_SA+1 following the sensor breakdown temperature T_SA (cf. S200 in FIG. 10). If a sensor breakdown function is not used, the definition point with the lowest temperature is selected as the lowest measurable temperature (characteristic temperature value 0x00, corresponding e.g. to a temperature of −62° C.)

The definition point with the highest temperature can be selected as the highest possible temperature (0xFF, assuming one byte of memory space). An alternative is to select the rotation speed of the last definition point for all temperature values that are greater than the last definition point. The last definition point can then also have a lower temperature value than 0xFF.

FIG. 12 shows the stored temperature and rotation speed values for each characteristic definition point P of the characteristic in FIG. 11. Each value is indicated in physical and program-specific magnitudes. Each temperature value T occupies one byte of memory, and the associated rotation speed value n occupies two bytes. An additional slope S=n/T (two bytes) is optionally also stored in order to speed up interpolation. The most significant bit of the two bytes of the slope serves as a sign bit, so that negative slopes are also possible. The assignment of program-specific temperature memory values (0x00 to 0xFF) to the physical outside temperature depends on the circuitry of the A/D converter. For example, a temperature memory value of 0x10 can also correspond to a negative physical temperature of −10° C.

Figure 13:
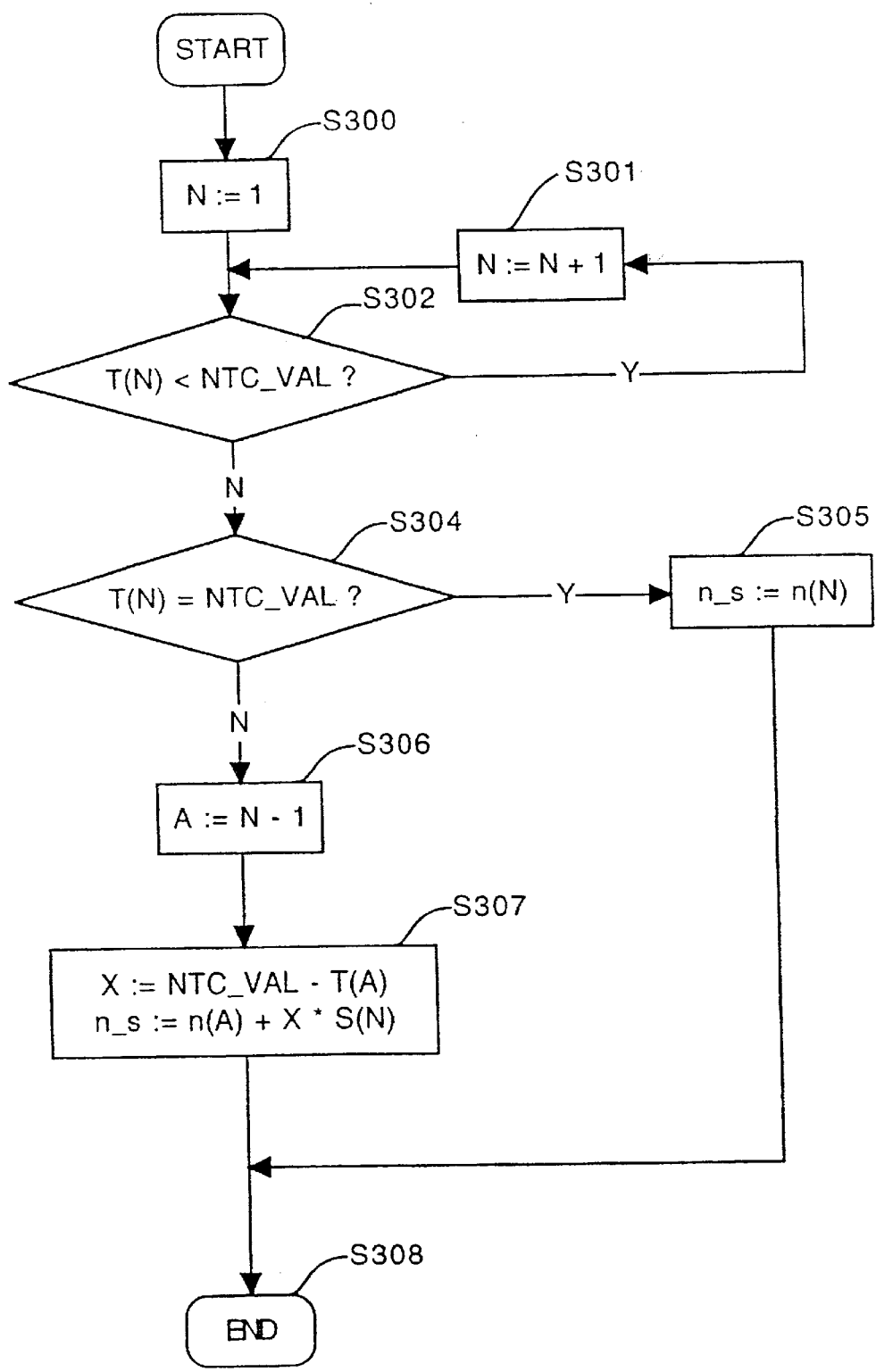
FIG. 13 is a flow chart for calculating the rotation speed setpoint from the characteristic definition.

FIG. 13 is a flow chart for the rotation speed setpoint calculation routine. In this example, the characteristic definition points each have a temperature value, a rotation speed value, and a slope which is valid for the region from the characteristic definition point to the next characteristic definition point. When $\mu$C 11 is started, the temperature values T (FIG. 12) are read out from EEPROM 26 and read into the RAM region of $\mu$C 11 to allow quick access. Because of limited RAM, the rotation speed values and slope values remain in EEPROM 26 and are loaded from there as needed. In EEPROM 26, all the temperature values are stored one behind another in one block, and the rotation speed and (optionally) slope values, one behind another, in another block. If sufficient RAM space is available, the rotation speed and slope can then also be loaded into the RAM of $\mu$C 11.

Upon branching to the rotation speed setpoint calculation routine, in S300 counter N is set to 1. The temperature values are stored as a table T(N), and in S302, a comparison is made to determine whether the Nth temperature value T(N) is less than NTC_VAL. If so, execution branches to S301 and N is incremented by 1. Execution then branches back to S302. If NTC_VAL is no longer greater than T(N), this means either that NTC_VAL=T(N) or that NTC_VAL lies between T(N) and T(N−1). Identity is checked in S304. If identity exists, rotation speed setpoint n_s is set equal to rotation speed setpoint n(N) of characteristic definition point N, and execution branches to the end.

If T(N) is not equal to NTC_VAL in S304, then in S306 variable A is given the value N−1; i.e. A corresponds to the characteristic definition point preceding characteristic definition point N.

Lastly, in S307, rotation speed setpoint n_s is then calculated for NTC_VAL.

Figure 14:
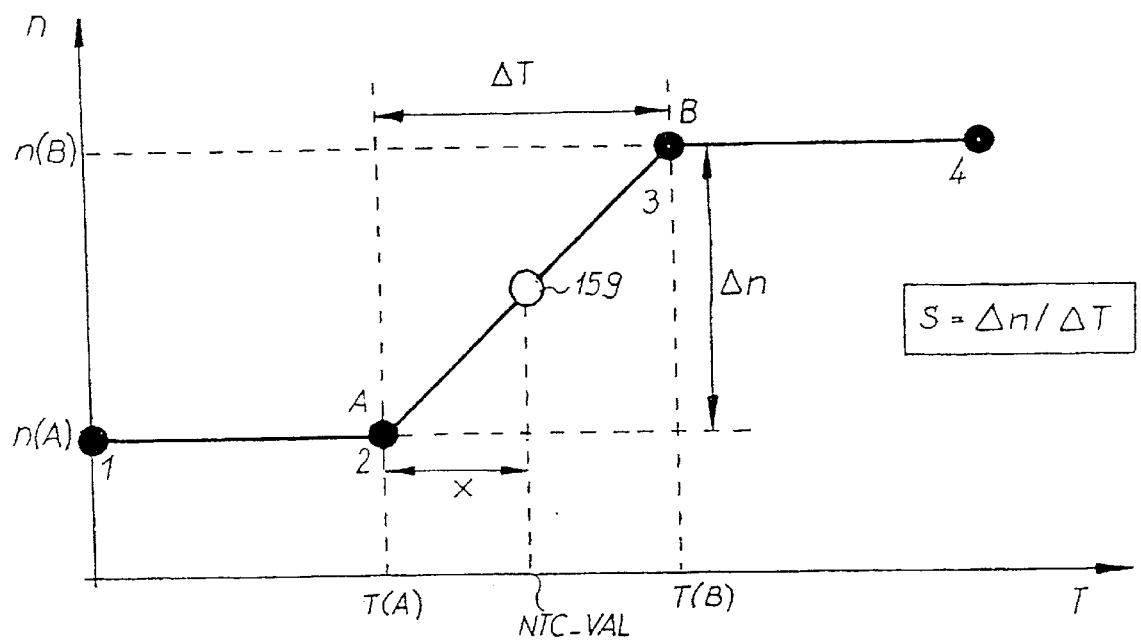
FIG. 14 shows a characteristic having a point interpolated for a specific temperature.

FIG. 14 shows an example in this context for a value NTC_VAL 159 that lies between the second and third definition points of a characteristic. A thus has a value of 2.

The distance X between temperature value T(A) and NTC_VAL is ascertained by subtraction (S307). The rotation speed setpoint n_s associated with NTC_VAL is ascertained by adding the product of X and slope S(N) to rotation speed n(A) of point A, i.e. n_s:=n(A)+X*S(N).

One possible variant of this type of interpolation is to define the slope to the left, i.e. from the particular characteristic definition point N toward characteristic definition point N−1. In this case the calculation of n_s (S306, S307) proceeds not from point N−1 but from point N.

Figure 15:
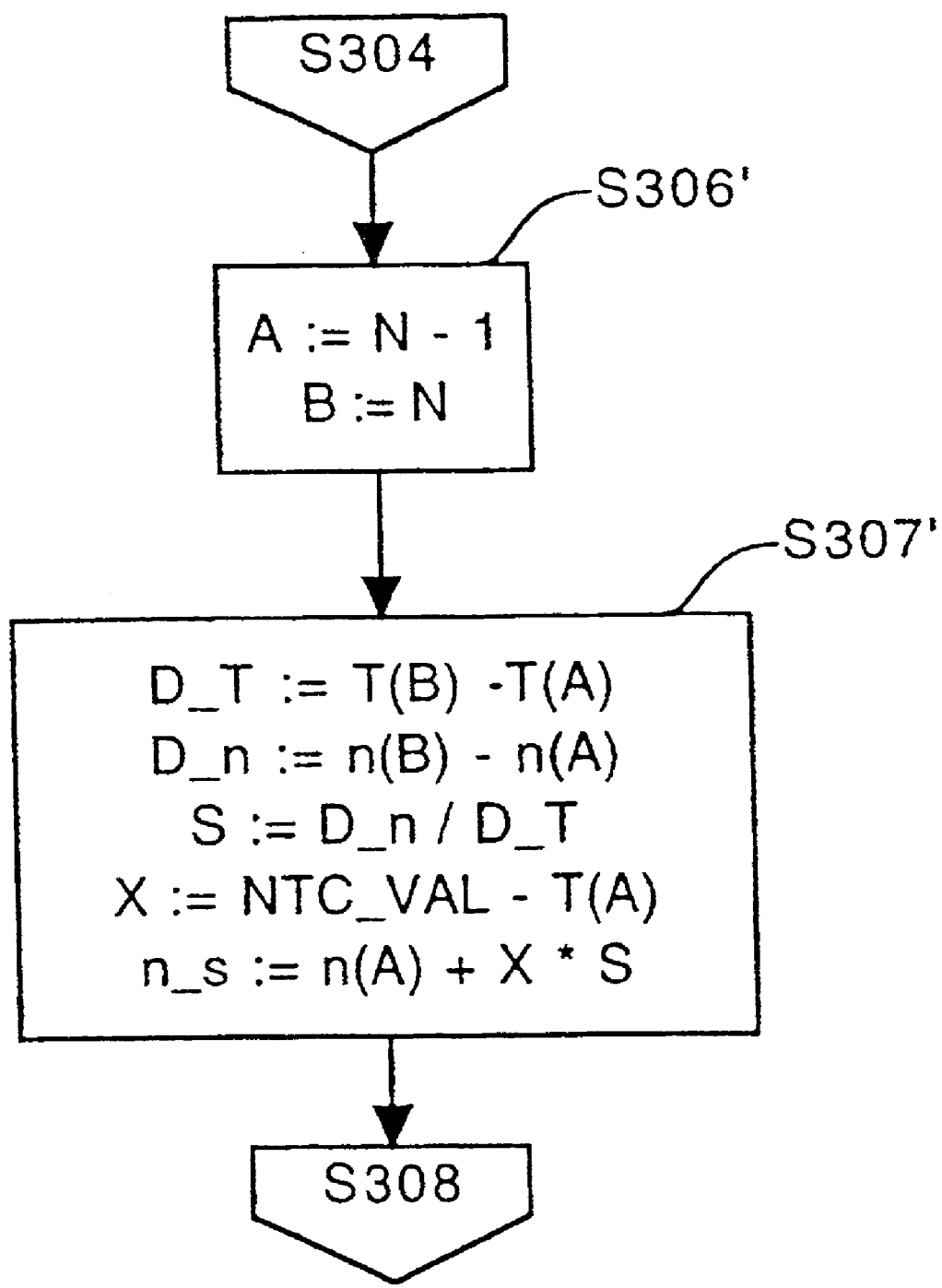
FIG. 15 is a flow chart with a variant of the procedure for calculating the rotation speed setpoint from the characteristic definition.

FIG. 15 shows the calculation of the rotation speed setpoint for the case in which a slope is not stored along with the characteristic definition points. Steps S300 to S305 of FIG. 13 are executed identically. But if T(N) is not equal to NTC_VAL in S304, then in S306' the two characteristic definition points surrounding NTC_VAL 159 (FIG. 14) are defined as A:=N−1 and B:=N (see FIG. 14). In S307', the slope S between points A and B is then calculated starting from point A. The temperature difference D_T (T) is calculated by subtracting T(A) from T(B), the rotation speed difference D_n (n) by subtracting n(A) from n(B), and the slope S by dividing D_n by D_T. The distance X between NTC_VAL and the temperature value T(A), and the rotation speed setpoint n_S, are calculated as in FIG. 13.

It is evident from the description of FIG. 15 that storing a slope for each characteristic definition point eliminates some of the calculations in S307 (FIG. 13) and thus also economizes on program code and program execution time.

CONVERTING THE ROTATION SPEED SETPOINT INTO A "HALL LENGTH" HL_s

Figure 16:
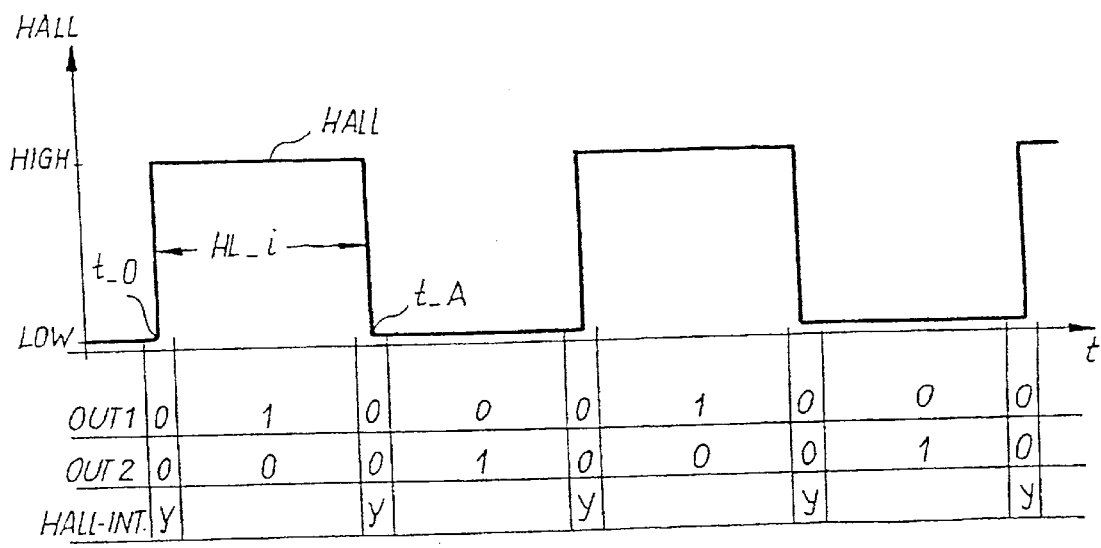
FIG. 16 shows a Hall signal and associated motor signals.

FIG. 16 shows a diagram with the Hall signal HALL (FIG. 4) which is present at port INT of $\mu C$ 11 (FIG. 4), the associated values for OUT1 and OUT2 (FIG. 19), and the times at which the Hall interrupts occur. The Hall signal is the basis for commutating the OUT1 and OUT2 signals (FIG. 19) for controlling motor 9, and calculating the actual Hall length HL_i, as shown here in an exemplary embodiment. Each change in HALL triggers in $\mu C$ 11 a Hall interrupt which is identified by a Y in FIG. 16. Since commutation must be very precise in order for the motor to run quietly, this interrupt takes priority over all other operations in the motor, i.e. it interrupts all other currently running processes; although the instruction currently in progress is still executed, then the instruction sequence of this interrupt executes, and then the previously interrupted process resumes.

Figure 17:
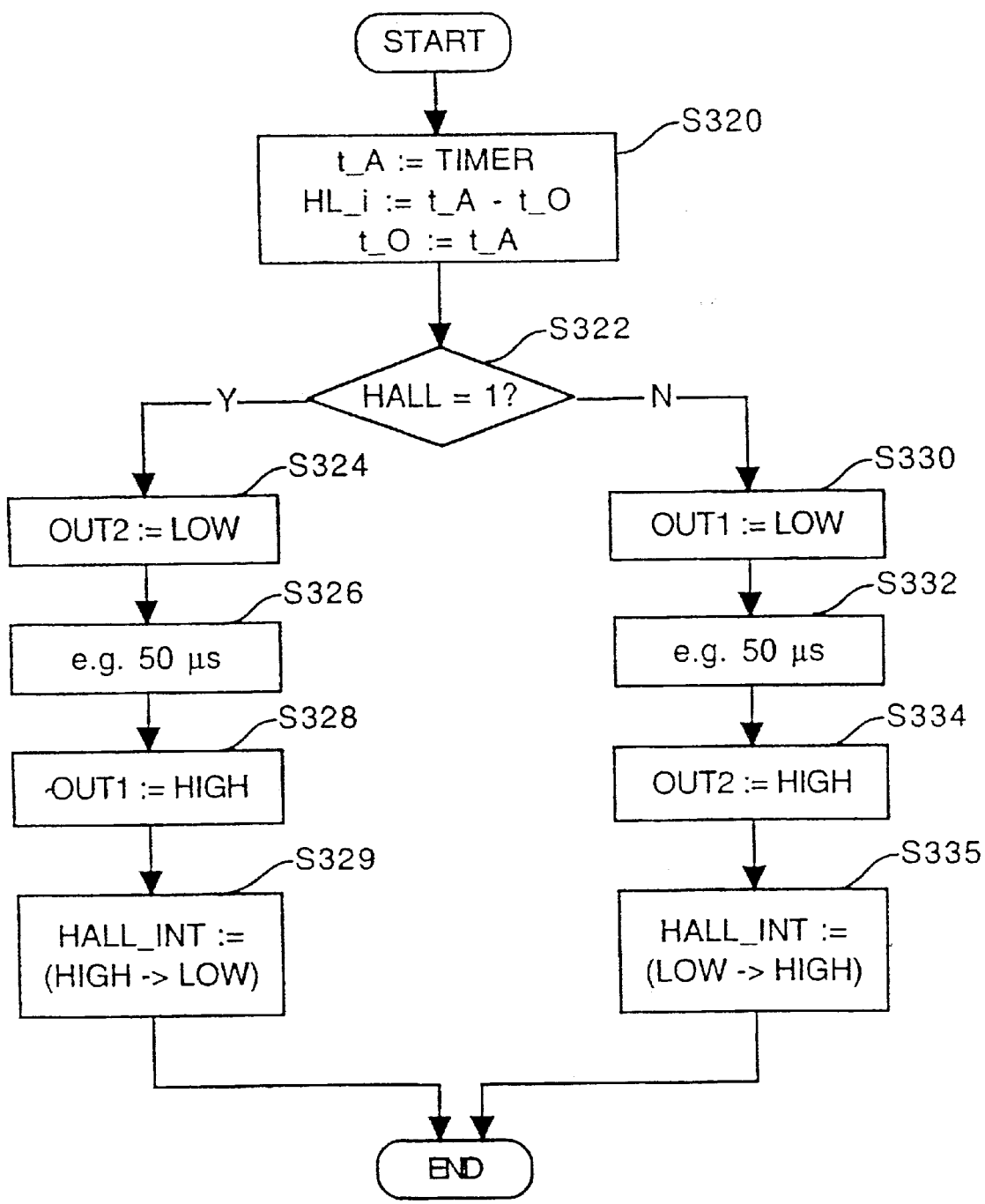
FIG. 17 is a flow chart of the Hall interrupt routine.

FIG. 17 shows an example of a Hall interrupt routine that is executed at each Hall interrupt.

In S320, Hall length HL_i is determined. A present timer value t_A is read out from a timer, and Hall length HL_i:=t_A−t_0 is calculated by subtracting the stored timer value t_0 from the time of the previous timer interrupt. Present timer value t_A is then stored in t_0 (S320). The resolution of the timer used in this exemplary embodiment is 1 $\mu s$, and Hall length HL_i is therefore available in $\mu s$. It is an indication of the rotation speed of motor 9.

Commutation is performed in the steps which follow. S322 checks whether HALL=1 (is HIGH). If HALL=1, then in S324 OUT2 is set to LOW. OUT1 and OUT2 are now LOW, and in S326 a commutation time gap is inserted in order to prevent a short circuit in bridge circuit 37 during commutation. The commutation gap is, for example, 50 $\mu s$ long. In S328, OUT1 is set to HIGH. Lastly, in S329 port HALL is configured to define the edge at which it will trigger a Hall interrupt HALL_INT. The edge can be set so that an interrupt is triggered either at the transition from HIGH to LOW (falling edge) or at the transition from LOW to HIGH (rising edge). Since the Hall signal is HIGH in the branch S324 to S329, port HALL must be set to a falling-edge interrupt, i.e. from HIGH to LOW, so that a Hall interrupt is triggered at the next Hall change.

If HALL=0 (is LOW) in S322, then the reverse commutation, and the reverse setting of HALL_INT, occur analogously in S330 to S335. Reference is made to DE 197 00 479.2 (internal: D201i) concerning time-shifting of the commutation times.

Conversion of the rotation speed setpoint n_s (in units of revolutions per minute) into a "Hall length" HL_s is now explained. Hall length HL' (in seconds) is defined as $$HL'=T/P$$

where T is the period length of one rotor rotation (in seconds) and P the number of rotor poles. If $$T=1/f \text{ and } f=n/60$$

where f is the frequency (in Hz) and n the rotation speed (in rpm), then $$HL'=60[s]/(n/[\min^{-1}]P).$$

Since the Hall length measured with the Hall sensor is available in $\mu s$, HL' is renormalized to HL_s:

$$HL\_s=1,000,000 \ HL'$$

For P=4, i.e. a four-pole rotor, the result is:

$$HL\_s=15,000,000 \ [\mu s]/(n/[\min^{-1}])$$

The desired rotation speed n_s=2870 min$^{-1}$ corresponds, for example, to a Hall length HL_s of HL_s=15,000,000 $\mu s$/2870=5226 $\mu s$. The internal hexadecimal representation of this is 0x146A. See FIG. 20 for the evaluation of HL_i and HL_s.

EEPROM FUNCTION

Figure 18:
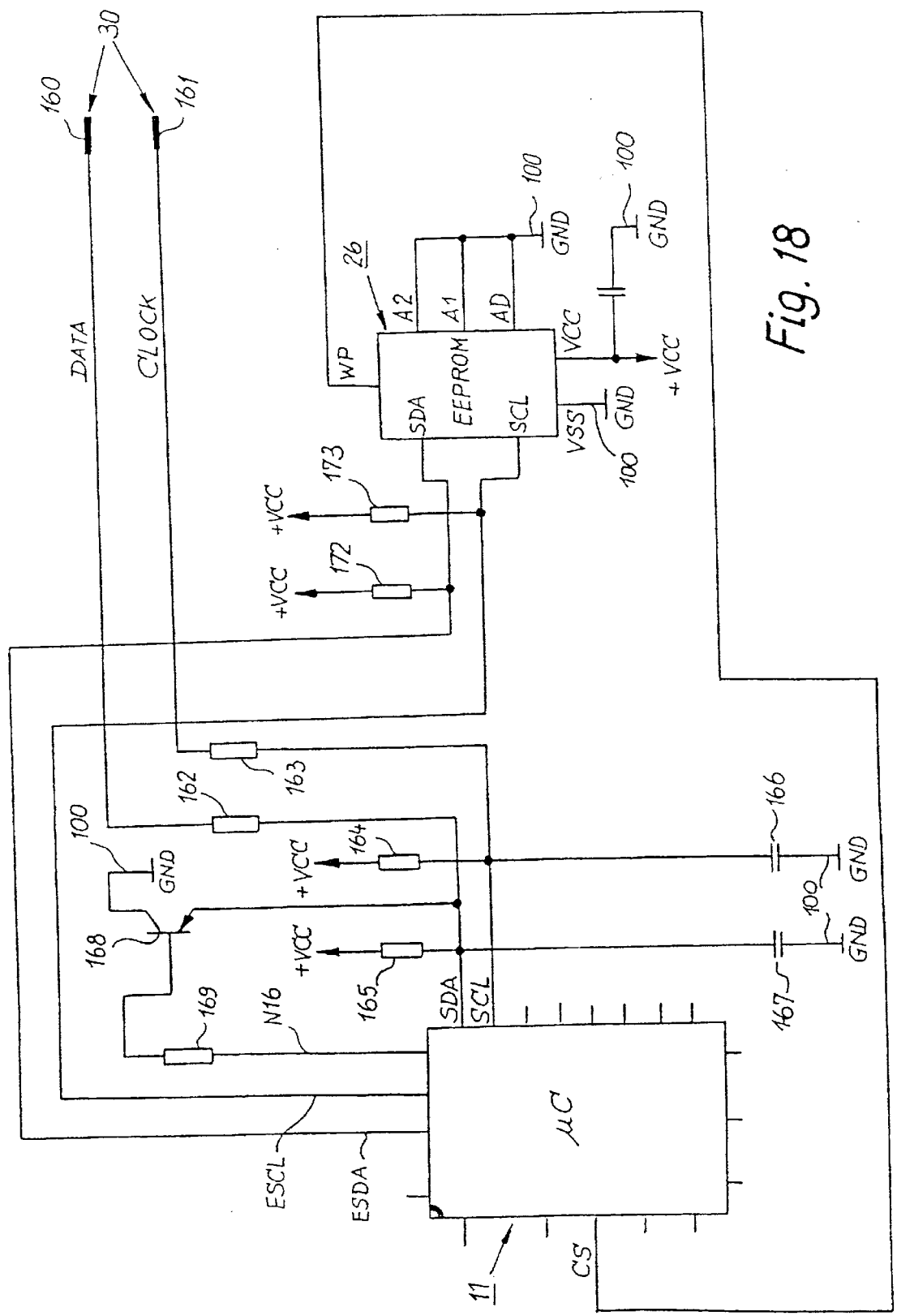
FIG. 18 is a circuit diagram with portions important for activating an EEPROM and access via a bus.

FIG. 18 shows the portion of the circuit concerning EEPROM 26 and bus interface 30. The pin assignment of $\mu C$ 11 is once again evident from FIG. 3. Parts identical or functionally identical to those in previous Figures are labeled with the same reference characters as therein. EEPROM 26 is, for example, an ATMEL AT24C01A two-wire serial CMOS EEPROM.

EEPROM 26 receives signal ESDA (FIG. 3) of $\mu C$ 11 at its data input SDA, and signal ESCL at its input SCL. Both lines are connected via resistors 172, 173 to +Vcc.

Write-protect input WP of EEPROM 26 is connected to pin CS (chip select) of $\mu C$ 11. If CS is HIGH, EEPROM 26 is write-protected; if CS is LOW, data can be written into EEPROM 26. Terminals VSS, AD, A1, and A2 of EEPROM 26 are connected to ground 100, and terminal VCC of EEPROM 26 is connected to +Vcc.

Lines ESDA and ESCL thus constitute the serial bus between $\mu C$ 11 and EEPROM 26, which can be operated as an IIC bus.

Normally EEPROM 26 is programmed once at the factory via bus interface 30, but reprogramming is possible at any time. EEPROM 26 can also serve, for example, as an operating data memory, for example for switch-on cycles, maximum recorded temperature, operating hours, and manufacturing data.

Bus interface 30 operates with an IIC bus. It has a data line DATA with a terminal 160 that is connected via a resistor 162 to terminal SDA of μC 11. From terminal SDA, a resistor 165 leads to +Vcc and a capacitor 167 is connected to ground 100. Terminal SDA is also connected to the emitter of a pnp transistor 168 whose collector is connected to ground 100 and whose base is connected via a resistor 169 to terminal N16 of μC 11.

Bus interface 30 furthermore has a clock line CLOCK with a terminal 161 that is connected via a resistor 163 to terminal SCL of μC 11. From terminal SCL of μC 11, a resistor 164 leads to +Vcc and a capacitor 166 goes to ground 100.

The purpose of the circuit with pnp transistor 168 is to connect both output N16 and input SCL of μC 11 to the bidirectional DATA line of the IIC bus.

Reference is made to DE 198 26 458.5 corresponding to PCT/EP99/03992, published Dec. 23, 1999 as WO 99-66633, whose US National Phase is U.S. Ser. No. 09/719,440, KARWATH, HORNBERGER, JESKE, RAPPENECKER & KALTENBRUNNER, filed Dec. 12, 2000 for a more detailed description of EEPROM 26 and bus interface 30 and their programming.

Password protection can be implemented by the fact that when two particular successive bytes (e.g. bytes 0xFA and 0x4A) are transferred from external IIC bus 30 to μC 11, a B_ACCESS bit is set in μC 11 in a memory location ACCESS; and when B_ACCESS is set, additional functions for modifying parameters, reading out EEPROM 26, and/or writing to EEPROM 26 are available. It is thus possible, for example, to protect against unauthorized modification of the characteristic by a customer.

An operating hour counter can also be interrogated via bus 30. This is implemented by the fact that when the fan is started, a 24-bit value WRK_TIME, comprising three bytes, is loaded from EEPROM 26 into μC 11, and every 10th time an A/D conversion begins (i.e. every 10 minutes, in the example above), the WRK_TIME 24-bit counter is incremented by 1 and written back into EEPROM 26. The value of WRK_TIME can then be interrogated, for example, via IIC bus 30. A further counter WRK_10 is used to count off every 10 A/D conversion operations.

CONTROLLING THE MOTOR

FIG. 19 shows the portion of the circuit important for controlling and driving the motor. The pin assignment of μC 11 is evident once again from FIG. 3. Outputs OUT1 and OUT2 of μC 11 control npn transistors 141, 142, 143, and 144, connected as H-bridge 37. The current through stator winding 38 flows in one or the other direction depending on whether OUT1 is HIGH and OUT2 is LOW, or vice versa. Between switchovers, OUT1 and OUT2 are both briefly LOW in order to prevent short-circuiting in bridge 37. Commutation is accomplished electronically, and the position of rotor 39 is sensed via Hall sensor 40 which is described in more detail in FIG. 4.

An output RGL of μC 11 is connected via a resistor 123 to a capacitor 124. When RGL is HIGH, capacitor 124 is charged; when RGL is LOW, the capacitor is discharged; and if RGL is at TRISTATE, capacitor 124 is decoupled from RGL and retains its voltage. Without current limiter 44, which is described later, point 125 could be connected directly to the positive input of comparator 120.

When npn transistor 150 is nonconductive (i.e. current limiter 44 is inactive), resistor 126 causes the voltage at a smaller capacitor 127 to be the same as at capacitor 124. The voltage at the positive input of comparator 120 can thus be influenced via output RGL of μC 11.

A triangular signal generated by a triangular oscillator 35 is present at the negative input of comparator 120. Triangular oscillator 35 has a comparator 130. From output P3 of comparator 130, a positive feedback resistor 132 leads to its positive input, and a negative feedback resistor 131 similarly goes from output P3 of comparator 130 to the negative input of comparator 130. A capacitor 135 is located between the negative input of comparator 130 and ground 100. The output of comparator 130 is additionally connected via a resistor 133 to +Vcc. The positive input of comparator 130 is connected via two resistors 134 and 136 to +Vcc and ground 100, respectively.

Three potential points P1, P2, and P3 are indicated in FIG. 19 to explain the operation of triangular generator 35. When the arrangement is switched on, P1 is connected to ground 100 through the discharged capacitor 135, and P2 is connected to +Vcc through 134 and is thus greater than P1. The comparator output (and thus P3) are therefore HIGH. Capacitor 135 is therefore charged via resistors 133 and 131, and the potential at P1 and thus the triangular signal increase. The value of P2 is defined by a) the parallel circuit made up of resistors 134, 133, and 132; and b) the lower voltage divider resistor 136.

The charging of capacitor 135 ultimately causes P1 to become higher than P2, and output P3 of comparator 130 therefore switches to LOW (i.e. ground). P3 thus goes to zero. Capacitor 135 therefore begins to discharge through resistor 131 and comparator 130, and this yields the falling portion of the triangular signal. The value of P2 is now defined by a) the parallel circuit made up of resistors 132 and 136; and b) voltage divider resistor 134.

When the discharging of capacitor 135 causes P1 to fall below P2, comparator 130 switches back to HIGH, i.e. +Vcc is once again present at P3. A triangular signal at, for example, 25 kHz is thus created.

When the voltage of the triangular signal at the negative input of comparator 120 is less than that of the reference signal at the positive input of comparator 120, the OFF output of comparator 120 is thus HIGH, and the lower transistors 141 and 143 can be switched by logical AND elements 147 and 148 through OUT1 and OUT2, respectively. When the voltage of the triangular signal is greater than that of the reference signal, the OFF output of comparator 120 is LOW, and current thus cannot flow through stator winding 38.

The voltage at capacitor 124 and thus also at capacitor 127 is thus used to establish the "pulse duty factor," i.e. the ratio between the time during which the output of comparator 120 is HIGH during one period of the triangular signal, and one complete period. The pulse duty factor can be between 0% and 100%. If the motor rotation speed is too high, for example, capacitor 124 is discharged via RGL and the pulse duty factor is thus decreased. All of this is referred to as pulse-width modulation (PWM). The purpose of pullup resistor 128 is to pull the open-collector output OFF of comparator 120 to +Vcc in the HIGH state.

To enable the motor to start when it is switched on, capacitor 124 is charged via RGL for a predefined period at initialization, so that the voltage at capacitor 127 reaches the necessary minimum value for activation of bridge 37.

Current limiter 44 is implemented by the fact that the current in stator winding 38 flows via a measurement resistor 140 to ground 100. The higher the current through resistor 140, the higher the voltage there and thus also the potential at point 149.

When the potential at 149 reaches a specific value, transistor 150 becomes conductive and reduces the voltage at capacitor 127, and the pulse duty factor at the output of comparator 120 thereby decreases. Resistor 126 prevents the large capacitor 124 from also being discharged when current limitation is effective, and speeds up current limitation because the small capacitor 127 can discharge quickly. After active current limitation is complete, the smaller capacitor 127 is recharged via capacitor 124, and thus set to its voltage. Resistor 126 and capacitor 127 thus act to prioritize current limiter 44.

Current limiter 44 has a filter element made up of a resistor 151 and a capacitor 152 to ground, followed by npn transistor 150 which, when the voltage at its base is sufficiently high, pulls the positive input of comparator 120 to ground 100. Following this is a further filter element made up of resistors 153 and 155 and capacitor 154.

Reference is made to DE 198 26 458.5 corresponding to PCT/EP99/03992, published Dec. 23, 1999 as WO 99-66633, whose US National Phase is U.S. Ser. No. 09/719,440, KARWATH, HORNBERGER, JESKE, RAPPE-NECKER & KALTENBRUNNER, filed Dec. 12, 2000 for a description of an alternative form of current limitation. As described there, it can also be configured and program-controlled using a comparator.

CONTROL ROUTINE

Figure 20:
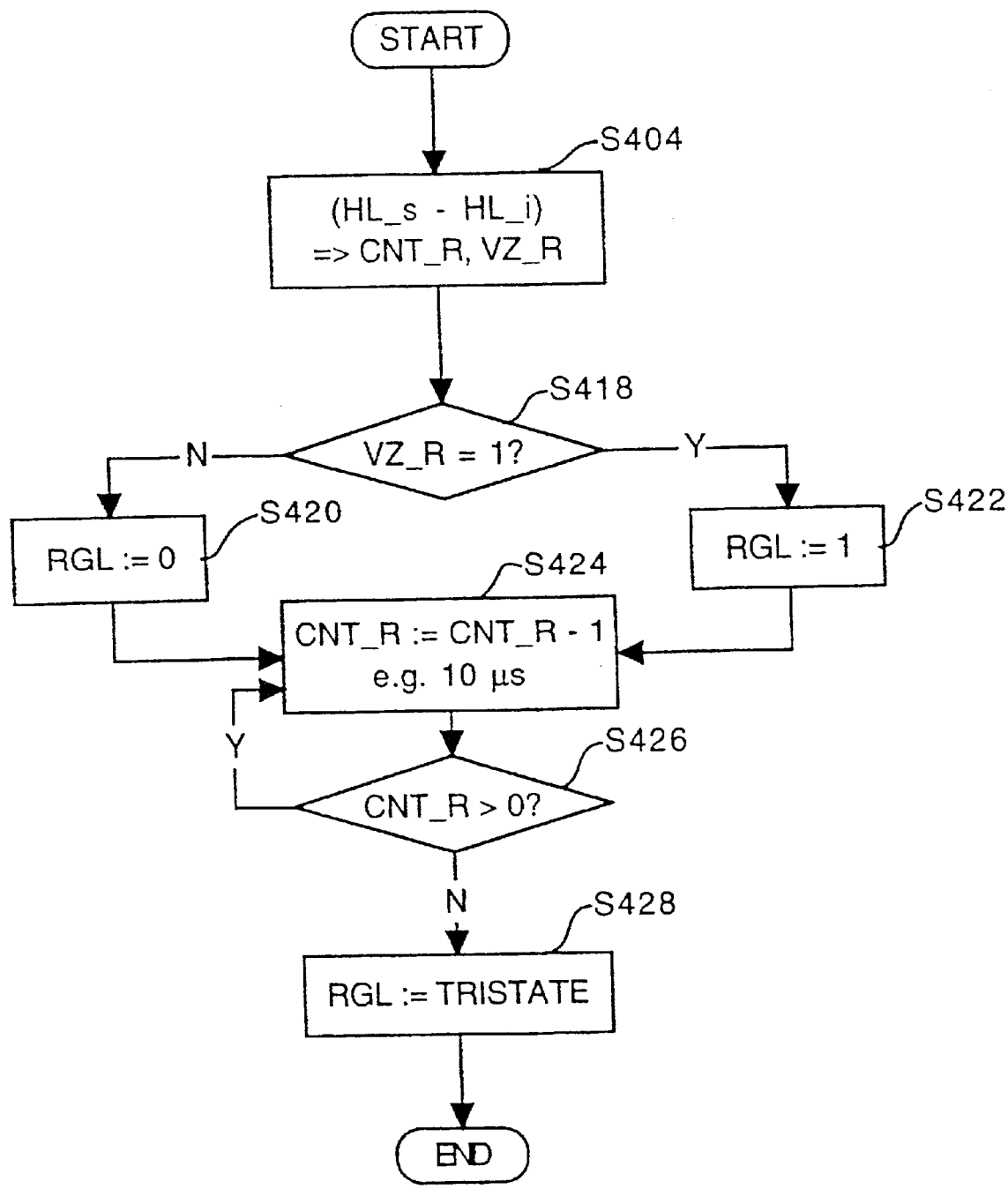
FIG. 20 is a flow chart for the basic rotation speed control process.

FIG. 20 shows a motor rotation speed control process implemented using $\mu$C 11.

In S404, the system deviation is calculated from Hall lengths HL_s and HL_i (cf. FIG. 16). The calculation is explained in more detail in FIG. 21. The result is a positive control output CNT_R for the magnitude of the system deviation, and a sign VZ_R which indicates whether the motor is too fast (VZ_R=0) or too slow (VZ_R=1).

S418 checks whether VZ_R=1. If VZ_R=1, the motor is then too slow, and capacitor 124 (FIG. 19) must be charged. For that purpose, in S422 port RGL (FIG. 3, FIG. 19) is set to HIGH via RGL:=1. Analogously, in S420 port RGL is set to LOW (via RGL:=0) if VZ_R=0, i.e. if the motor is too fast.

Once port RGL has been set, in the example shown in FIG. 20 there is a delay time proportional to the magnitude CNT_R of the system deviation, during which capacitor 124 and thus also capacitor 127 (FIG. 19) are charged or discharged.

This is done by means of a loop that begins in S424. CNT_R is decremented by 1, and execution waits for, e.g., 10 $\mu$s. S426 then checks whether CNT_R>0. If so, then the value CNT_R used as the loop counter has not yet been processed, and execution branches back to S424. If CNT_R=0 in S426, then the loop has been run through a total of CNT_R times ("CNT_R" meaning the original value CNT_R calculated in S404).

After the loop is complete (S424 and S426), in S428 port RGL is set back to TRISTATE, and charging or discharging of capacitor 124 is terminated.

Figure 21:
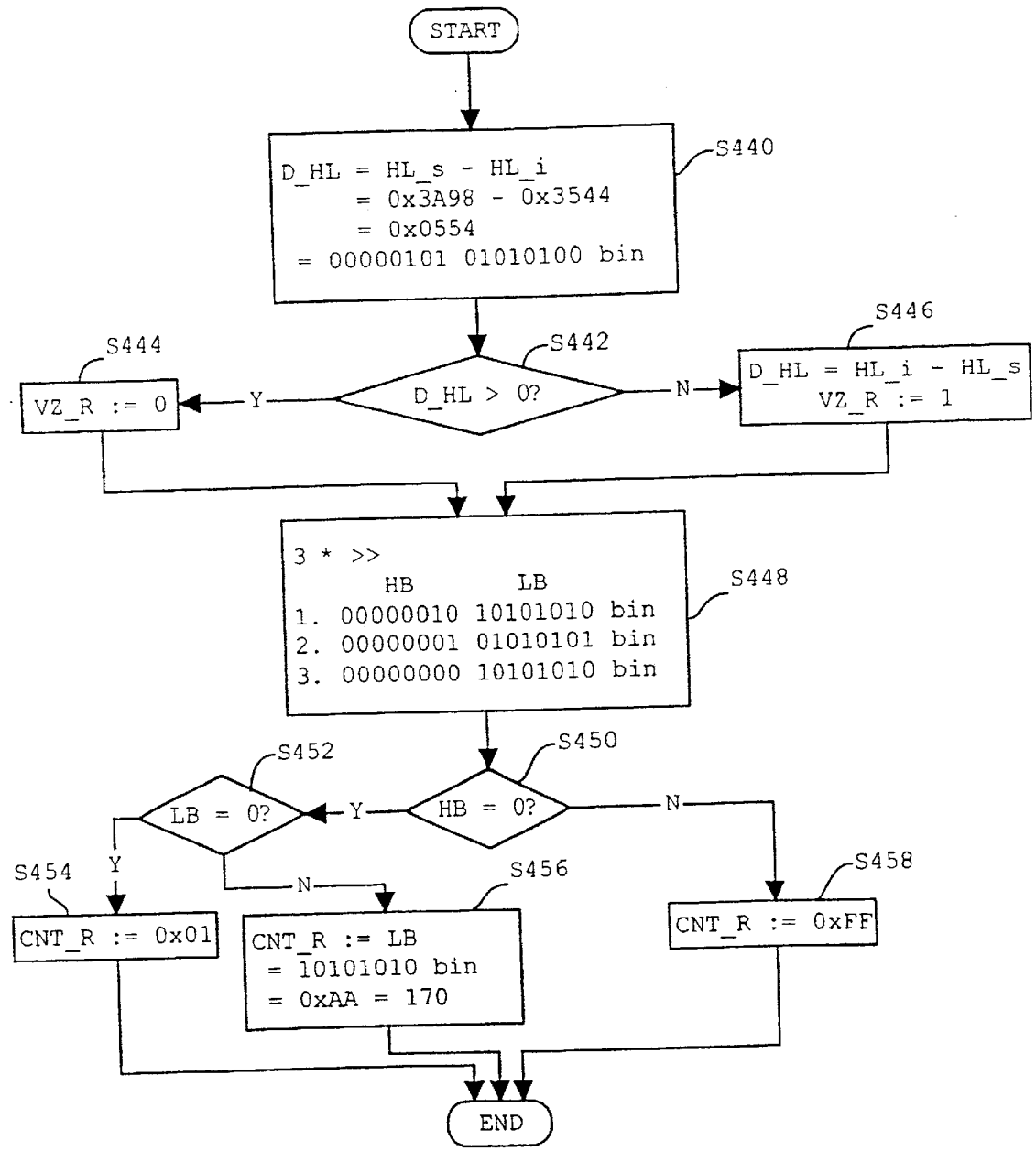
FIG. 21 is a flow chart for calculating the control output and the sign for the control process from FIG. 20.

FIG. 21 shows, using a numerical example, the manner in which control output CNT_R and sign VZ_R are calculated from the system deviation, i.e. S404 in FIG. 20. In S440, the difference D_HL between the "Hall length" HL_s corresponding to the rotation speed setpoint and the measured Hall length HL_i (FIG. 16) is calculated. As an example, a rotation speed setpoint of 1000 rpm is assumed, corresponding to a "Hall length" of 15,000 $\mu$s and thus a two-byte number 0x3A98. The actual rotation speed here is 1100 rpm, which corresponds to a Hall length of 13,636 $\mu$s and a two-byte number 0x3544. The difference D_HL is thus 0x0554, which is also indicated in binary notation in S440.

S442 checks whether difference D_HL is positive. If so, then in S444 VZ_R is set to zero; otherwise in S446 D_HL is calculated from the inverse of the difference (HL_i—HL_s) and is thus positive, and sign VZ_R is set to 1.

In S448, D_HL is shifted three times to the right, a zero always being shifted into the most significant bit (MSB) of HB. The reason for shifting is that control output CNT_R can be only 1 byte long, and system deviation D_HL is often too long. Shifting three times to the right corresponds to an integral division by 8, discarding the remainder. The shift causes the information in the three least significant bits of LB to be lost. In the example in S440, the shift is shown in binary notation.

S450 checks whether HB=0 after the three shifts to the right. If it is not, the shifted D_HL is then still longer than 1 byte, and in S458 CNT_R is set to the maximum value 0xFF (binary: 11111111). If Hs=0 in S450, then S452 checks whether LB is also equal to 0. If LB is not equal to zero, then in S456 CNT_R is set to equal LB. In our example above, CNT_R is set to 0xAA (corresponding to decimal 170). If LB was equal to 0 in S452, then it is possible that a system deviation nevertheless existed in the three least significant bits of LB before the shift in S448. To avoid permanently retaining a small system deviation, CNT_R is therefore set to 0x01 in S454. Sign VZ_R and value CNT_R at the end of the routine in FIG. 21 are used in FIG. 20 for the control process.

Figure 23:
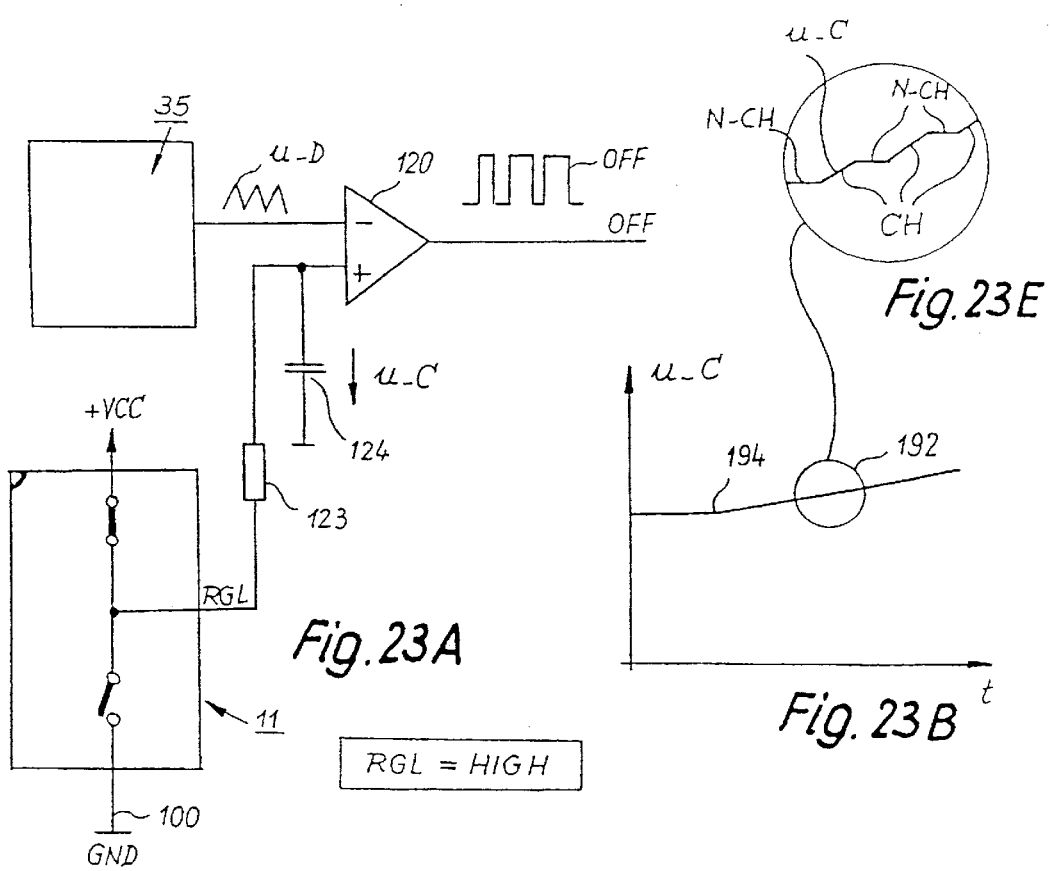
FIGS. 23A through 23E illustrate the control process for a motor at too low a rotation speed.
Figure 23:
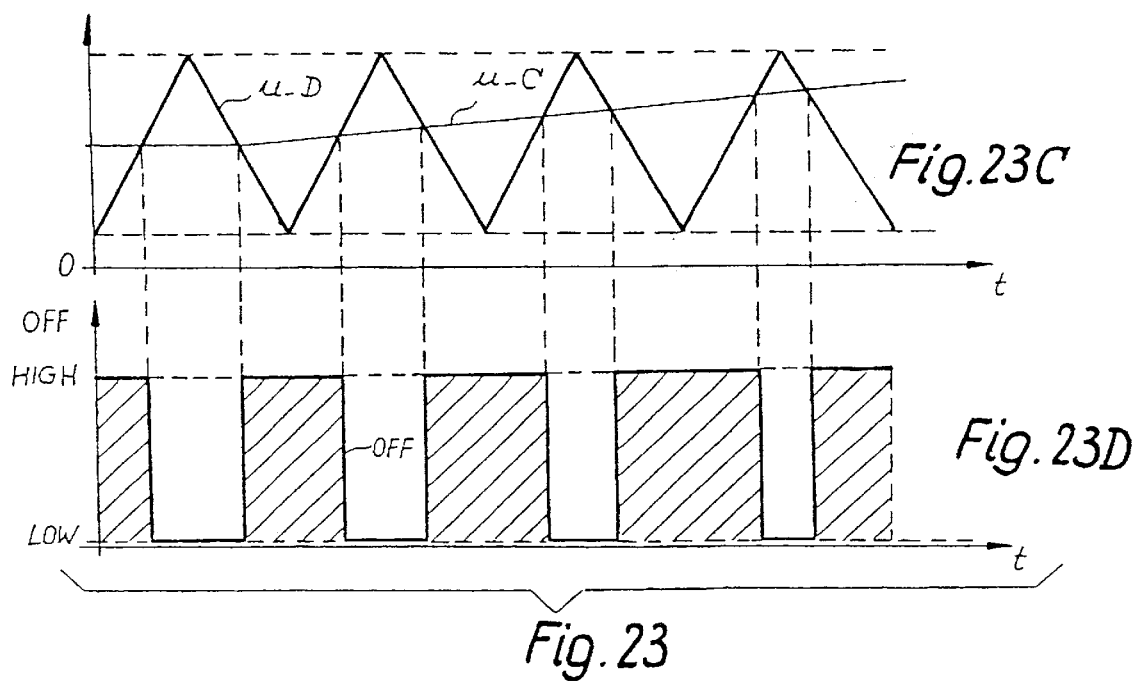

FIG. 22 shows the PWM OFF signal for the case in which RGL=TRISTATE, FIG. 23 shows the OFF signal during charging of adjustable capacitor 124, and FIG. 24 shows the OFF signal during discharging of adjustable capacitor 124.

FIGS. 22A, 23A, and 24A show the control circuit. Triangular oscillator 35 is connected to the negative input of comparator 120. Output RGL is depicted, using an equivalent circuit diagram in the interior of $\mu$C 11, for the respective states RGL=TRISTATE, RGL=HIGH, and RGL=LOW. By way of current limiting resistor 123, RGL leaves adjustable capacitor 124 unchanged (FIG. 22), charges it (FIG. 23), or discharges it (FIG. 24). The PWM signal is present at the OFF output with a pulse duty factor defined by the voltage U_C.

FIGS. 22B, 23B, and 24B show the change over time in voltage U_C for the respective state of output RGL; in FIGS. 23B and 24B, RGL is switched over at time 194 from RGL=TRISTATE to HIGH and LOW, respectively.

FIGS. 22C, 23C, and 24C respectively show, in a voltage/time diagram, voltage U_D of the triangular signal generated by triangular oscillator 35, and voltage U_C of adjustable capacitor 124 for the respective state of output RGL. Note that here the instantaneous value of triangular voltage U_D is always greater than 0.

FIGS. 22D, 23D, and 24D show the PWM OFF signal resulting from FIGS. 22C, 23C, and 24C. In FIG. 22D, the pulse duty factor remains the same over time, in FIG. 23D it becomes greater as U_C increases, and in FIG. 24C [sic] it becomes smaller as U_C decreases.

Figure 29:
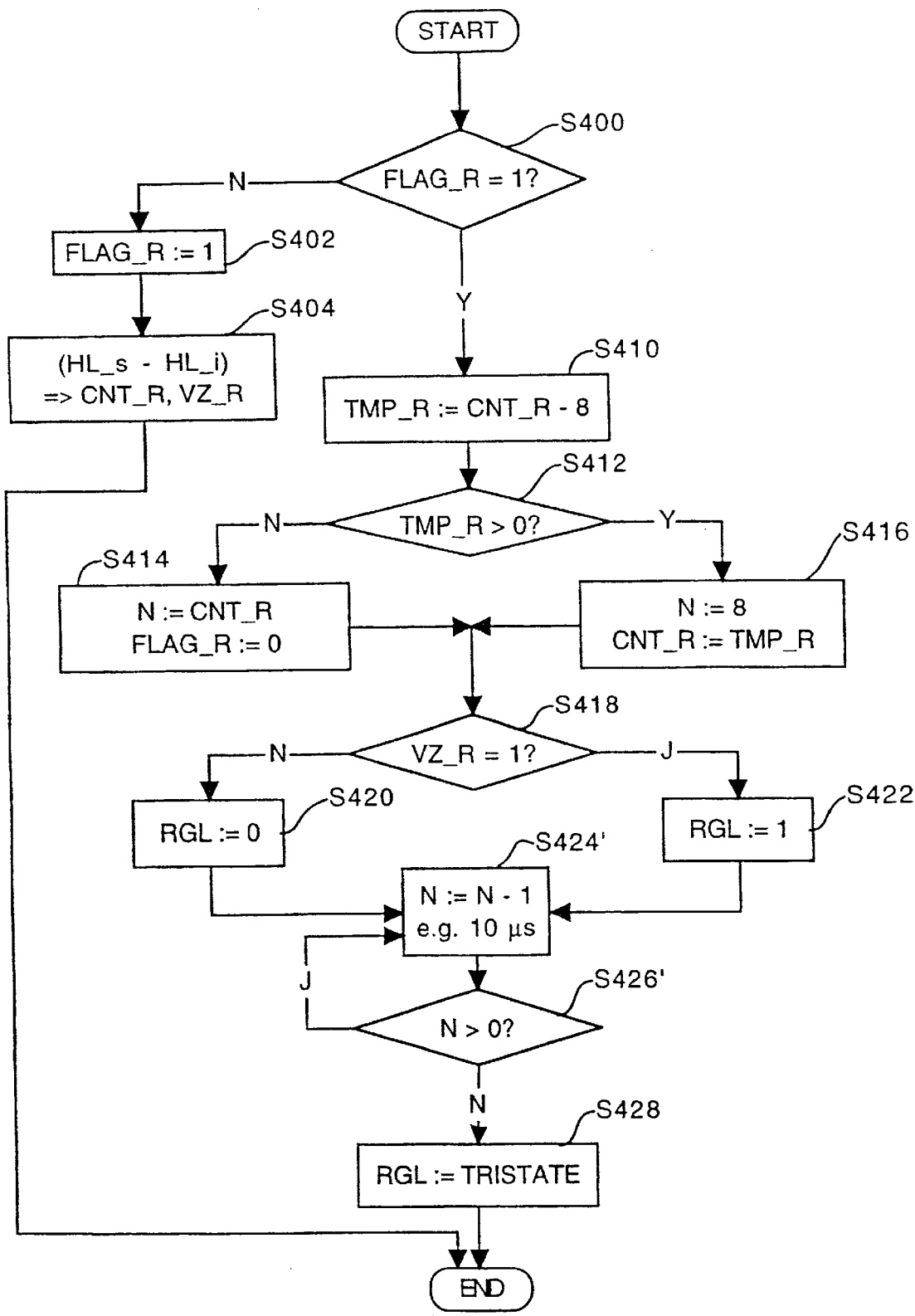
FIG. 29 shows a control routine modified for the function manager.

FIG. 23E shows an enlarged portion 192 of FIG. 23B. The rise in voltage U_C of the capacitor is repeatedly interrupted. This is attributable to the division of the control process (described in FIG. 29) into small time segments or morsels. In FIG. 29, each time the control process is invoked, RGL is set to HIGH and capacitor 124 is briefly charged. Before the control process terminates, RGL is set back to TRISTATE and voltage U_C at capacitor 124 remains constant. In FIG. 23E, charging is labeled CH and the constant intervals are labeled N-CH.

FIG. 24E shows, analogously, an enlarged portion 193 of FIG. 24B for the situation in which capacitor 124 is being discharged, again for the sequence shown in FIG. 29.

Figure 25:
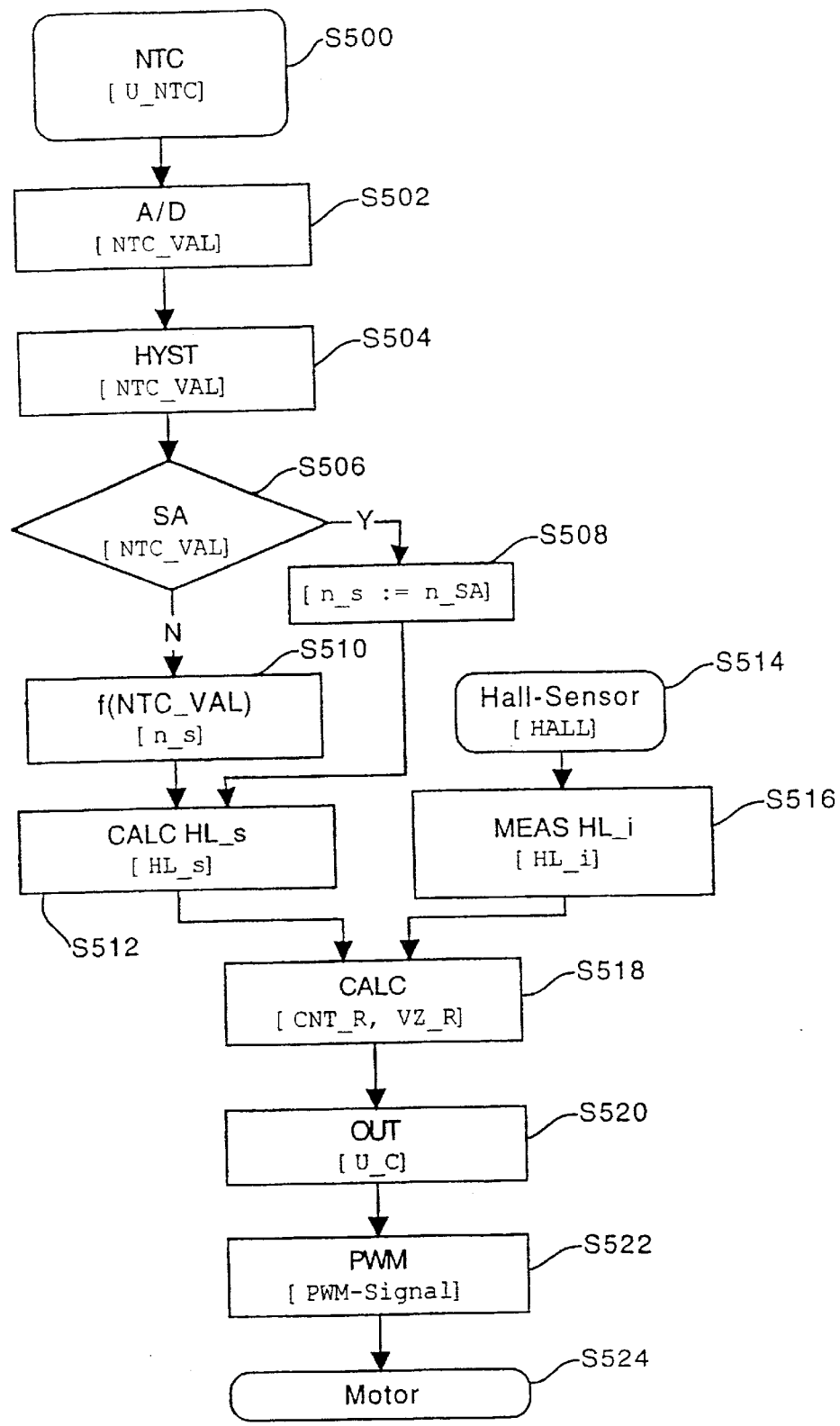
FIG. 25 shows an overall sequence for the control process.

FIG. 25 shows the overall control sequence. In S500, the temperature is detected via temperature-dependent NTC resistor NTC (FIGS. 2 and 4). In S502, A/D converter A/D converts voltage U_NTC at the NTC resistor into a digital temperature value NTC_VAL (FIGS. 2, 4, 5, 6, and 7). In S504, a hysteresis HYST of the characteristic is performed (FIGS. 8 and 9). A sensor breakdown function SA in S506 check whether any defect is present in A/D converter A/D (FIG. 10). In the event of a sensor breakdown, calculation of the rotation speed setpoint is bypassed, a fixed sensor breakdown rotation speed n_SA is selected in S508, and execution branches to the Hall length calculation CALC HL_s in S512. Using the NTC value NTC_VAL from the hysteresis function HYST, in S510 a rotation speed setpoint n_s is calculated using a characteristic function f(NTC_VAL) (FIGS. 11, 12, 13, 14, and 15). In S512 the rotation speed setpoint is converted by a Hall length calculation CALC HL_s into a "Hall length" HL_s. The actual rotation speed of the motor is detected in S514 using a Hall sensor that supplies a HALL signal (FIGS. 4, 16, and 17). In S516 ("MEAS HL_i"), the Hall interrupt triggered by the HALL signal is used to measure Hall length HL_i between two Hall interrupts (FIGS. 16 and 17). Using the two Hall lengths for the setpoint and actual value, in S518 the "CALC" controller calculates a control output CNT_R for the magnitude of the difference between HL_s and HL_i, and a sign VZ_R (FIG. 21). Based on CNT_R and VZ_R, in "OUT" (S520) voltage U_C of a capacitor 124 is increased or decreased (FIGS. 19 and 20). In "PWM" S522, voltage U_C of capacitor 124 is used to set the pulse duty factor of the PWM signal (FIG. 19). Lastly, in S524 the speed of the motor is regulated by way of the pulse duty factor of the PWM signal.

FUNCTION MANAGER

Figure 26:
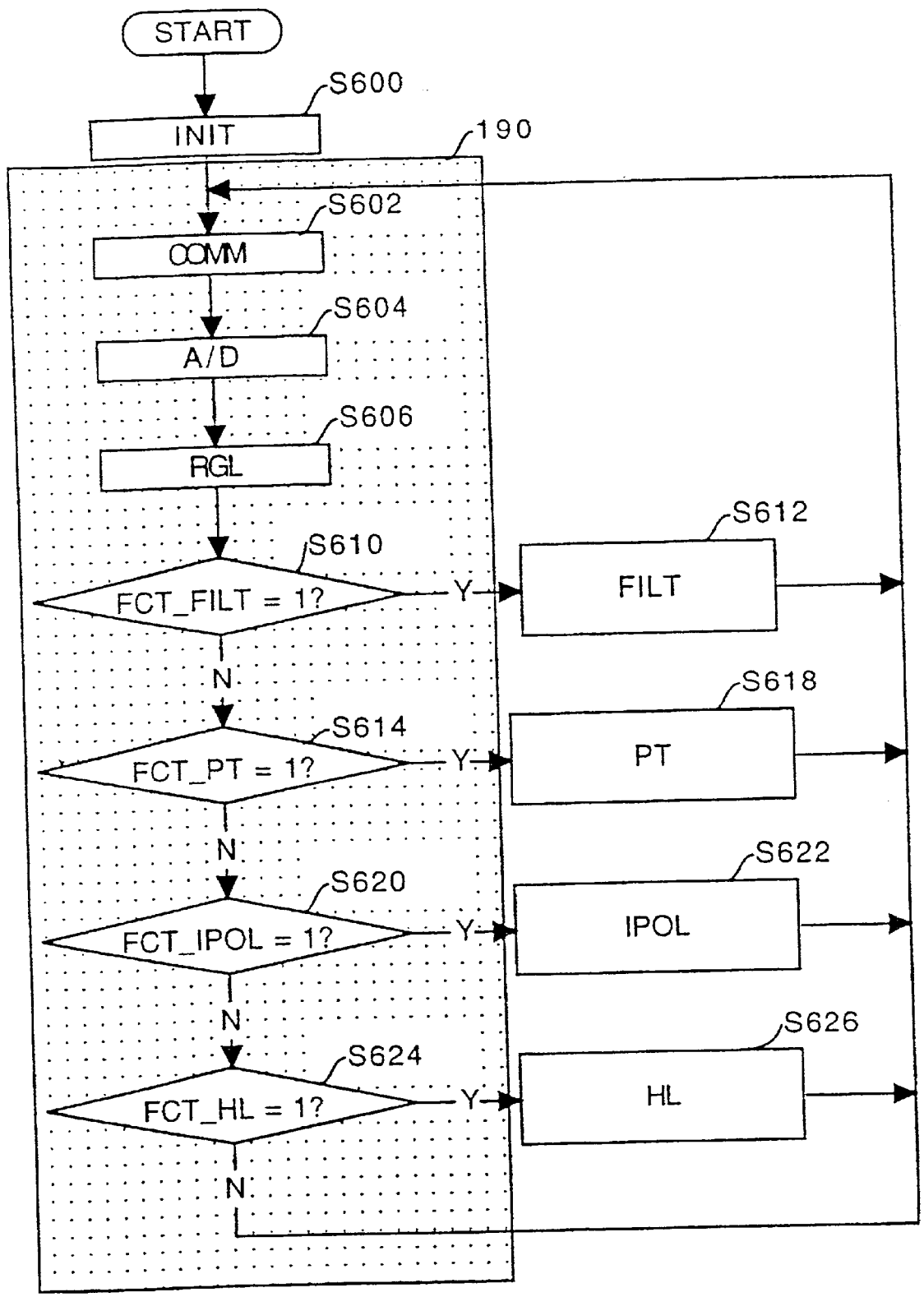
FIG. 26 shows a preferred embodiment of a function manager.

FIG. 26 shows a flow diagram with one possible embodiment of the overall program that executes in μC 11. After the fan is switched on, an internal reset is triggered in μC 11. In S600, initialization of μC 11 occurs. For example, parameters are read out from EEPROM 26, capacitor 124 (FIG. 19) of the PWM control system is charged to a minimum value, and watchdog timer WDCNT 79 for the A/D converter is started.

After initialization, execution branches into a so-called function manager 190 that begins in S602. The function manager controls the execution of the individual subprograms.

The functions processed first are those that are time-critical and must be processed at each pass. These include the communication function COMM in S602, since IIC bus 30 (FIG. 18) must be checked, for example at a baud rate of 2 K, every 250 μs. In S604 the A/D converter (S502, FIG. 25) is invoked, and in S606 the motor rotation speed control process RGL (S518 and S520 in FIG. 25).

Figure 27:
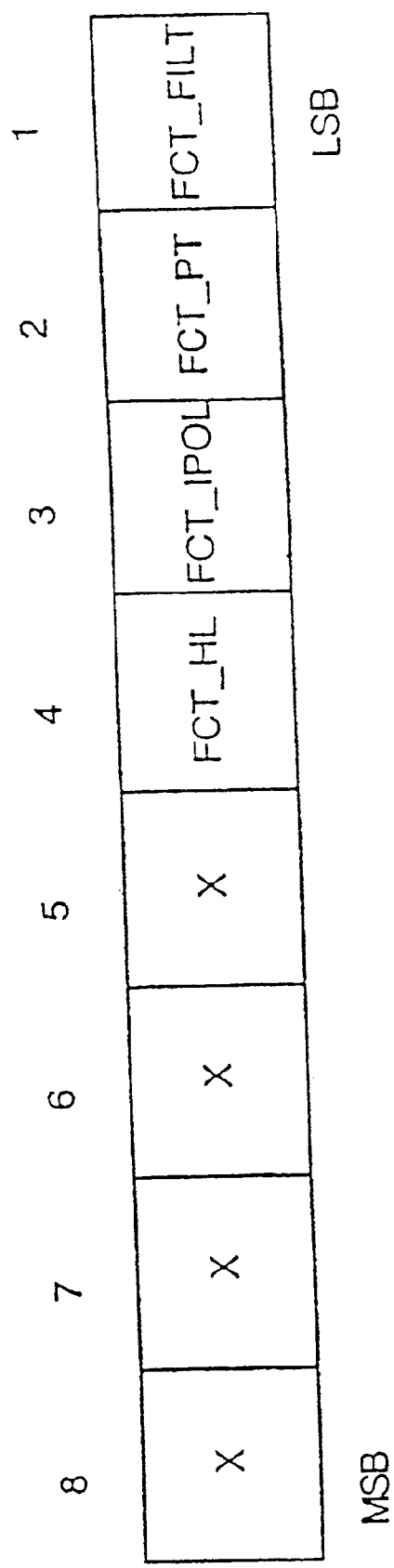
FIG. 27 shows a function register used in the function manager.

FIG. 27 shows an example of a function register 195 in which one bit is reserved for each further function.

In this example, function register 195 is 1 byte long; and the following request bits are defined, beginning with the least significant bit (LSB), for the requestable functions explained below:

FCT_FILT for the hysteresis and sensor breakdown function;

FCT_PT for the characteristic point determination function;

FCT IPOL for the rotation speed interpolation function;

FCT_HL for the Hall length calculation function for calculating HL_s.

The remaining bits are reserved for further requestable functions that may be appended to function manager 190. In this example, function register 195 occupies 1 byte, but it can be expanded to include additional bytes.

When a specific requestable function needs to be requested by another function or an interrupt routine, the bit of the requested function is then set to 1. The next time around, if function manager 190 has not invoked any other higher-priority requestable function during a pass. the function is executed.

When processing of a requested function is complete, it sets its bit (FIG. 27) back to 0. This makes it possible for functions that cannot be processed in one pass (for example because they require too much time) to be divided up and processed in multiple invocations.

In FIG. 26, after S606 a check is made, in a predetermined order beginning with the most important requestable function, of whether each request bit is set. If this is the case for a function, it is executed, and the program then branches back to the beginning S602 of function manager 190. The sequence in which function register 195 is checked defines the prioritization of the requestable functions. The higher up any such function is located in function manager 190, the higher its priority.

The functions that are invoked must be sufficiently short that their processing time, added to the functions S602 through S606 that are always executed, is never greater than the maximum allowable time between two interrogations of the IIC bus. In the example above with a baud rate of 2 K and a maximum allowable time of 250 μs, the maximum processing time for the functions requested in S610 through S624 is approx. 100 μs. The functions listed in FIG. 25 must therefore in most cases be subdivided into segments of shorter duration.

The subdivision of the functions shown in FIG. 26 represents only one preferred example.

Step S610 checks whether request bit FCT_FILT for a filter function is set, i.e. has a value of 1. If it is set, execution then branches to FILT S612, and the hysteresis function (S504, FIG. 25) and sensor breakdown function (S506 and S508, FIG. 25) are executed in FILT. These are referred to as "filter" functions because the hysteresis function filters out small fluctuations in the value NTC_VAL in the negative direction, and the sensor breakdown function filters out impossible values of NTC_VAL. Moving averaging using previous values of NTC_VAL are also possible.

If FCT_FILT was not set in S610, then PT S614 checks whether FCT_PT is set. If so, then one or both (depending on the calculation variant) of the characteristic definition points surrounding the measured value NTC_VAL are determined in PT S614 and loaded (portion of S510, FIG. 25).

If neither FCT_FILT nor FCT_PT were set in S610 and S614, and if FCT_IPOL is set in S620, then rotation speed setpoint n_s pertaining to the value NTC_VAL is calculated in IPOL S622 (portion of S510, FIG. 25).

If none of the bits checked in S610 through S620 were set, and if FCT_HL is set in S624, then in HL S626, the "Hall length" HL_s is calculated from rotation speed setpoint n_s (S512, FIG. 25). Execution then branches back to S602.

If a request bit was not set in any of the interrogations up to S624, then execution branches back to S602 with no action, and the functions that are executed at each pass of function manager 190 are invoked again.

The function manager results in optimum utilization of the resources of μC 11.

An overview of the interaction among the various functions will be given below.

In this exemplary embodiment (FIG. 26), the communication function in S602 is executed first. The external IIC bus 30 (FIG. 18) is read from or written to, or data are written into or read from the EEPROM.

The A/D converter in S604 is also invoked at each function manager pass.

Figure 28:
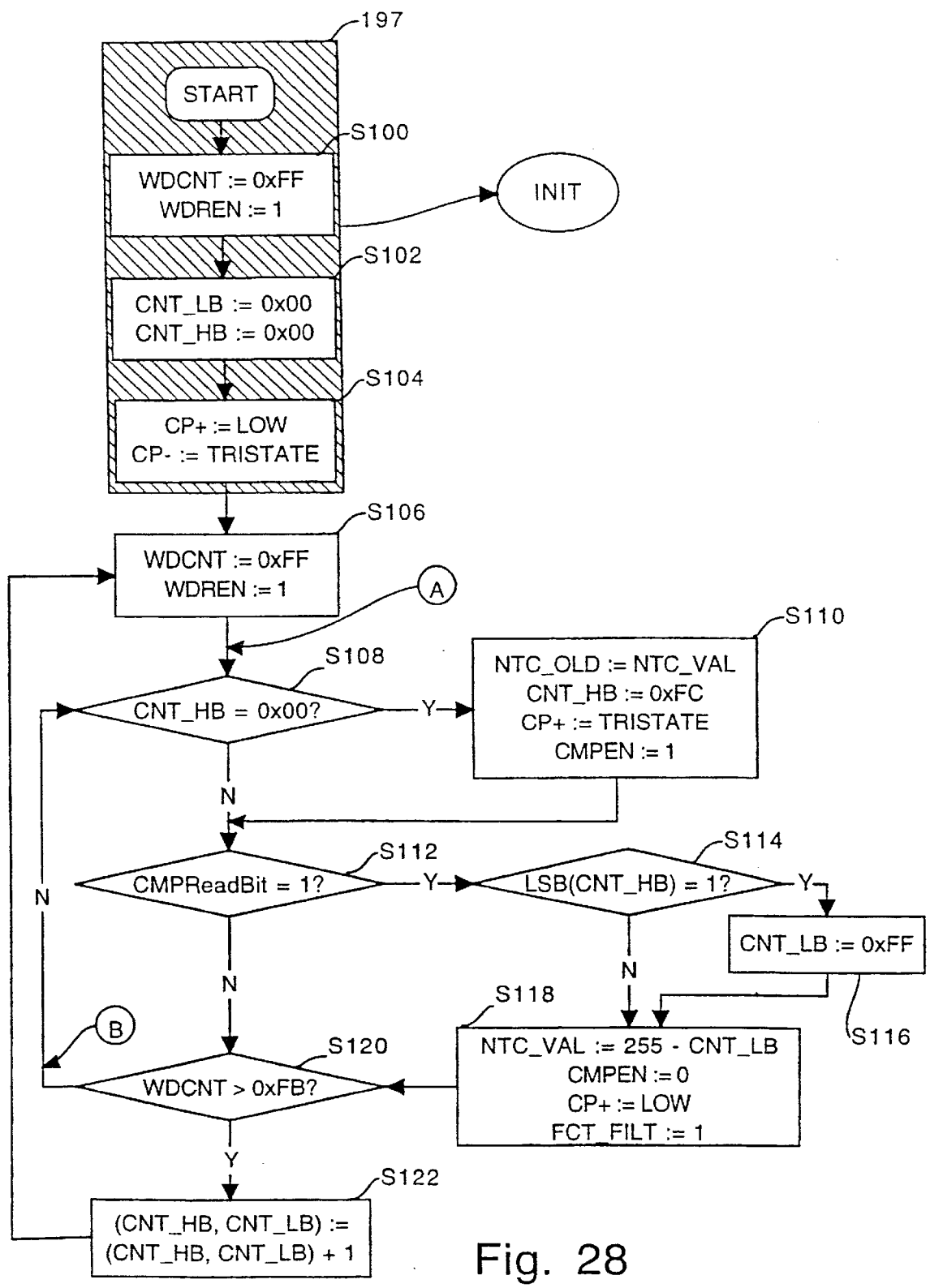
FIG. 28 shows an A/D conversion routine modified for the function manager.

FIG. 28 shows the A/D converter from FIG. 5 as modified for the function manager shown in FIG. 26. Initialization portion 197 in S100 through S104 is executed in initialization portion INIT in S600 of the main program. The jump into the A/D converter takes place at point A between S106 and S108. Execution leaves the A/D converter again at point B, i.e. if the comparison WDCNT>0xFB yields a response of No (N). Step S106 is not forgotten in this context. If the condition WDCNT>0xFB is no longer true in S120, then (as in FIG. 5) counter CNT80 constituted by (CNT_HB 81, CNT_LB 82) is incremented in S122, and then in S106 watchdog timer WDCNT is set back to 0xFF and the watchdog timer is started again.

After each completed A/D conversion, i.e. when a new value NTC_VAL is present in S118, request bit FCT_FILT is set to 1 in S118 so that the filter function is executed at the next opportunity in S612 (FIG. 26).

In S606 (FIG. 26), control process RGL (S518 and S520, FIG. 25) is invoked.

FIG. 29 shows an exemplary embodiment of a control process RGL adapted for function manager 190, based on FIG. 20. Parts identical or functionally identical to those in FIG. 20 are therefore labeled with the same reference characters as therein, and usually are not described therein.

The calculation of CNT_R and VZ_R in S404 requires so much time that execution leaves the control process directly after the calculation. This is achieved by introducing a flag FLAG_R. If the condition FLAG_R=1 is not met in S400, then another invocation of the control process exists. In S402, FLAG_R:=1 sets FLAG_R to 1 and thus signals that the control process is active. Then, as in FIG. 20, the control calculation is performed in S404 and execution branches out of the control process.

At the next invocation of the control process, FLAG_R=1, i.e. the control process is active, and now capacitor 124 must be charged or discharged as in steps S418 through S428 of FIG. 20.

The charging or discharging of capacitor 124 must be divided into smaller blocks, since charging or discharging of capacitor 124 (FIG. 19) of the PWM control system often takes longer than 100 μs.

For that purpose, as shown in FIG. 29, the control process is modified so that each time the control process is invoked (S606 in FIG. 26), capacitor 124 is charged or discharged in morsels, so that no invocation of the control process takes longer than the maximum time of, for example, 100 μs allowed by the IIC bus.

For that purpose, before the decision in S418 (FIG. 29), two further variables TMP_R and N, and steps S410 through S416, are introduced. In S410, variable TMP R has assigned to it the value (CNT_R−8), i.e. the control output value CNT_R minus the number 8. If TMP_R>0, then in S412 execution branches to S416; otherwise it branches to S414. In S416 (i.e. if CNT_R is greater than 8) a counter variable N is assigned the value 8 and CNT_R is assigned the value TMP_R, so that the next time the control process is invoked, the new control output CNT_R is known. In S414 (i.e. if CNT_R is less than or equal to 8), counter variable N is assigned the value CNT_R, and FLAG_R is set to 0, since at this invocation of the control process CNT_R is completely processed.

In steps S418 through S428, as in FIG. 20, capacitor 124 is charged or discharged (depending on sign VZ_R) during one loop pass. In contrast to FIG. 20, however, the loop is not run through CNT_R times, but rather N times, i.e. a maximum of 8 times. This is done by replacing CNT_R with N in S424' and S426'.

The overview of the interaction of the various functions in FIG. 26 will now be continued.

Because FCT_FILT is set by the A/D converter in S604 (FIG. 26), when a new NTC_VAL is present, the hysteresis function (FIG. 9) and sensor breakdown function (FIG. 10) are invoked at the next opportunity from S610 (FIG. 26).

Once the hysteresis and sensor breakdown functions are executed in S612, FCT_FILT is set back to 0, and in S612 FCT_PT is set to 1, so that characteristic determination function S618 is invoked at the next execution branch to S614.

Once the characteristic determination function in S618 is complete, it sets FCT_PT to 0 and FCT_IPOL to 1. Then lastly, at the next execution branch to S620, S622 is invoked. Once the rotation speed interpolation function in S622 is complete, it sets FCT_IPOL to 0 and FCT_HL to 1.

Since FCT_HL=1, in S624 the Hall length calculation function S626 is then invoked, and upon its completion FCT_HL is set once again to zero. In S626, a setpoint HL_s for the "Hall length" is calculated.

The function manager makes it possible to insert further subprograms as applicable, and to adhere to the time limitation imposed by IIC bus 30 in simple fashion. It also makes it easy for the subprograms and interrupt routines to invoke other subprograms.

The configuration of the main program in the form of a function manager is suitable for all devices that have a microprocessor or microcontroller which controls both a bus and other tasks, e.g. controlling a motor vehicle engine.

The table below shows typical examples of values for the components used:

Capacitors:

135 1.5 nF 127, 152 10 nF 14, 90 22 nF 99, 110, 166, 167 33 nF 154 100 nF

Tantalum capacitor:

124 3.3 μF

Resistors:

140 3 ohms 162, 163 47 ohms 94, 153, 155 1 kohms 133, 136 2.2 kohms 106 3.3 kohms 164, 165 4.7 kohms 123, 131, 132 10 kohms 170 22 kohms 92, 114, 126 33 kohms 134 47 kohms 16, 91, 93, 96, 101, 112, 128, 169 100 kohms NTC resistor:
18 NTC 100 kohms
npn Transistor 150 BC846
pnp Transistors 95, 168 BC856B
Comparators 108, 120, 130 LM2901D
Hall sensor 40 HW101A
EEPROM 26 AT24C01A two-wire serial CMOS EEPROM (Atmel)
Microcontroller 11 COP 842 CJ (Nat. Semicond.)

What is claimed is:

1. A electric motor having a rotation speed controlled by a variable analog physical parameter characterizing a temperature, comprising:
 a data field, stored in the form of individual digital values, for assigning values of said physical parameter to corresponding rotation speed values of the electric motor; and
 a microcontroller adapted for accessing the stored individual digital values, and having associated therewith a program for interpolation between individual values stored in the data field, in order to determine by interpolation, and to control, the rotation speed in respective ranges between at least two adjacent ones of said stored individual digital values; further comprising:
 an A/D converter for converting the variable physical parameter into a digital value; and
 a hysteresis function for evaluating data output by the A/D converter and which, in the event of a small change in the variable physical parameter, retains the digital value ascertained during a previous A/D conversion in order to reduce rotation speed fluctuations of the motor.

2. The electric motor according to claim 1, wherein the hysteresis function is effective in the case of a change in temperature in one direction, but not in the case of a change in temperature in the opposite direction.

3. The electric motor according to claim 1, wherein the individual digital values are stored, at least partially, in vector form.

4. The electric motor according to claim 1, further comprising a temperature-dependent resistor for sensing said variable physical parameter characterizing a temperature.

5. The electric motor according to claim 1, comprising an arrangement for checking whether an overflow occurs during conversion in said A/D converter.

6. The electric motor according to claim 5, wherein, when an overflow occurs, the digital value resulting from A/D conversion is replaced with a predefined digital value.

7. The electric motor according to claim 1, wherein the A/D converter has, downstream from it, a plausibility function which checks the digital value ascertained during an A/D conversion for plausibility, and replaces an implausible digital value with a predefined digital value.

8. The electric motor according to claim 1, wherein a rotation speed controller is associated with the electric motor, and the signal generated during the A/D conversion is used to generate a desired value signal for that rotation speed controller.

9. The electric motor (9) according to claim 8, wherein what is used as an actual-value signal is a digital signal which is substantially proportional to the time required for the rotor of the electric motor to rotate through a predefined rotation angle.

10. The electric motor (9) according to claim 9, wherein the digital value ascertained during A/D conversion is converted (S512) into a value for the time to be required for the rotor (39) to rotate through the predefined rotation angle.

11. The electric motor according to claim 10, wherein one of
 a difference between the digital desired value signal and the digital actual-value signal, or vice versea, is determined, in order to obtain a digital deviation signal (CNT_R) for the magnitude of the deviation between desired value and actual value, and a digital sign signal (VZ_R) for the sign of that deviation.

12. The electric motor (9) according to claim 11, wherein a pulse width modulation (PWM) actuator, whose pulse duty factor is controllable by the voltage at a capacitor (124), is provided for controlling the motor current; and that capacitor is charged or discharged for a time period which is substantially proportional to the absolute magnitude of the digital deviation signal, the digital sign signal controlling whether the capacitor is charged or discharged.

13. The electric motor (9) according to claim 1, further comprising
 a nonvolatile memory (26) adapted for storing the digital values of the data field.

14. The electric motor (9) according to claim 13, wherein at least some of the individual digital values stored in the nonvolatile memory (26) are modifiable.

15. The electric motor according to claim 14, comprising a terminal adapted for connection to an input device for inputting a value into the nonvolatile memory.

16. The electric motor (9) according to claim 14, wherein a connection is provided to a data buss over which data can be transferred into the nonvolatile memory.

17. The electric motor according to claim 15 having associated therewith a microcontroller wherein
 data transfer to and from the nonvolatile memory is controllable by said microcontroller.

18. The electric motor according to claim 17, wherein the microcontroller associated with the motor is configured, for data connection with an external input device, as a so-called "slave" of that data connection.

19. The electric motor (9) according to claim 1, further comprising a counter for counting motor operating time.

20. The electric motor (9) according to claim 19, wherein the operating time can be polled from outside.

21. The electric motor according to claim 1, wherein the individual digital values are each stored,
at least partially, as a data point with an associated slope value.

22. A method for temperature-dependent control of the rotation speed of an electric motor having associated therewith a memory and a rotation speed controller, said method comprising the following steps:
 a) value clusters of characteristic definition points are stored in said memory, said value clusters containing at least one value characterizing a specific temperature, and one rotation speed datum associated with that specific temperature;
 b) a sensed value characterizing the temperature that controls the motor rotation speed is sensed at time intervals c) the presently sensed value is compared to a previously sensed value characterizing a temperature sensed during a previous sensing operation;

d) based on the comparison, it is ascertained whether the presently sensed temperature either has increased, or has decreased by at least a predetermined minimum value;

e) if the presently sensed temperature has not increased, and has not either decreased by at least the predetermined minimum value, a previously determined desired rotation speed of the electric motor is left unchanged;

f) if the presently sensed temperature either has increased, or has decreased by at least the predetermined minimum value, the presently sensed value is compared to the stored values characterizing the temperature and stored in said memory, a stored value adjacent to the presently sensed value is ascertained, by way of an interpolation proceeding from that adjacent value, a rotation speed datum for the presently sensed value is ascertained, and a value derived from that interpolated rotation speed datum is used to determine a new desired rotation speed for the rotation speed controller.

23. The method according to claim 22, wherein the interpolated rotation speed datum is ascertained by linear interpolation.

24. The method according to claim 23, wherein for at least one characteristic definition point, a slope for linear interpolation is stored in addition to the value characterizing a specific temperature and a rotation speed datum associated with that value.

25. The method according to claim 22, wherein the values stored in the memory are modifiable.

26. The method according to claim 22, wherein the sensed value characterizing the temperature is compared to a value characterizing the temperature that was sensed during a previous sensing operation; and a change in the value serving to define the desired rotation speed is made only if either the temperature has increased, or if it has decreased by a predefined minimum value.

27. The method according to claim 22, wherein the predefined minimum value is stored as a variable.

28. The method according to claim 27, wherein the predefined minimum value is modifiable in the nonvolatile memory via a bus.

29. The method according to claim 22, wherein the presently sensed value characterizing the temperature is checked for plausibility; and a predefined desired rotation speed value is generated if that presently sensed value corresponds to a temperature that does not occur in practical use, in particular to a very low temperature.

30. The method according to claim 29, wherein a minimum temperature is assumed for the temperature that does not occur in practical use, and a specific rotation speed datum is associated with all temperatures which are lower than or equal to that minimum temperature.

31. The method according to claim 30, wherein the predefined minimum temperature and the associated rotation speed datum are stored in a nonvolatile memory and are modifiable.

32. The method according to claim 31, wherein the electric motor is set to its maximum rotation speed if the sensed value characterizing the temperature corresponds to a temperature that does not occur in practical use.

33. The method according to claim 22, wherein a pulse width modulation process, having a sawtooth signal present at one input of a comparator, and a voltage defined by a capacitor and modifiable by a microcontroller at another input of the comparator, are used to control the motor rotation speed.

34. The method according to claim 33, wherein any modification in the charge of the capacitor is interrupted at least once by another process.

35. An electric motor having its rotation speed controlled by a variable physical parameter characterizing a temperature, comprising:

an A/D converter for converting the variable physical parameter into a digital value;

a nonvolatile memory for storing therein a data field in the form of individual digital values, for assigning values of said converted physical parameter to corresponding rotation speed values of the electric motor;

a microcontroller adapted for accessing the stored individual digital values, and having associated therewith a program for interpolation between individual values stored in the data field, in order to determine by interpolation, and to control, the rotation speed in respective ranges between at least two adjacent ones of said stored individual digital values;

and a terminal (FIG. 18: 160, 161) for connection to a data source for inputting data from said data source into said nonvolatile memory under control of said microcontroller, thus enabling a change to be made in the assignment of said converted physical parameter to a corresponding rotation speed value.

36. The electric motor according to claim 35, wherein said microcontroller is configured, for the data connection with said data source, as a so-called "slave" of that data connection.

37. The electric motor according to claim 36, wherein data in said nonvolatile memory are adapted to be polled via said data connection.

38. The electric motor according to claim 35, wherein the individual digital values are stored in said memory, at least partially, in vector form.

39. The electric motor according to claim 35, further comprising a temperature-dependent resistor for sensing said variable physical parameter characterizing a temperature.

40. The electric motor according to claim 35, comprising an arrangement for checking whether an overflow occurs during conversion in said A/D converter.

41. The electric motor according to claim 40, wherein, when an overflow occurs, the digital value resulting from the A/D conversion is replaced with a predefined digital value.

42. The motor according to claim 40, in which the microcontroller has a checksum function for discrete values stored in the memory.

* * * * *

UNITED STATES PATENT AND TRADEMARK OFFICE
CERTIFICATE OF CORRECTION

PATENT NO.   : 6,496,340 B1
DATED        : December 17, 2002
INVENTOR(S)  : Hornberger et al.

It is certified that error appears in the above-identified patent and that said Letters Patent is hereby corrected as shown below:

Title page,
Item [75], Inventors, "Georgen" should be -- St. Georgen --.

Column 1,
Line 14, "[(internal: D183)]" should be deleted.
Line 16, "[(internal: EP184)]" should be deleted.
Line 18, "[(internal: D190i)]" should be deleted.
Line 19, "[(internal: D192)]" should be deleted.
Line 20, "[(internal: EP193)]" should be deleted.
Line 22, "[(internal: EP194)]" should be deleted.
Line 24, "[(internal: D195)]" should be deleted.
Line 26, "[(internal: D199i)]" should be deleted.
Line 28, "[(internal: EP200)]" should be deleted.

Column 8,
Line 6, "CNT HB" should be -- CNT_HB --.
Line 7, "CNT LB" should be -- CNT_LB --.
Line 34, "D/A" should be -- A/D --.
Line 40, "CNT HB" should be -- CNT_HB --.

Column 10,
Line 21, after ")" -- . -- should be inserted.

Column 16,
Line 24, "Hs=0" should be -- HB=0 --.

Column 19,
Line 64, "TMP R" should be -- TMP_R --.

Signed and Sealed this

Twenty-ninth Day of July, 2003

JAMES E. ROGAN
*Director of the United States Patent and Trademark Office*